United States Patent [19]

Boon et al.

[11] Patent Number: 5,036,113

[45] Date of Patent: Jul. 30, 1991

[54] TIRE HAVING RADIATION CURED AIR BARRIER COATING

[75] Inventors: Wyndham H. Boon, North Canton; Robert J. Gartland, Austintown; Patrick J. Pesata, Jr., Medina, all of Ohio

[73] Assignee: The Goodyear Tire & Rubber Company, Akron, Ohio

[21] Appl. No.: 407,806

[22] Filed: Sep. 14, 1989

Related U.S. Application Data

[62] Division of Ser. No. 126,989, Nov. 30, 1987, Pat. No. 4,874,670.

[51] Int. Cl.$^5$ ............................................. C08G 18/32
[52] U.S. Cl. ...................................... 522/96; 522/174; 528/66
[58] Field of Search ...................... 522/96, 174; 528/66

[56] References Cited

U.S. PATENT DOCUMENTS

| | | | |
|---|---|---|---|
| 4,254,230 | 3/1981 | Howard | 522/96 |
| 4,333,963 | 6/1982 | Emmons et al. | 522/96 |
| 4,360,540 | 11/1982 | Chong | 522/96 |

OTHER PUBLICATIONS

"Tuftane" Technical Information and Selector Guide, Brochure DS 10-5001B, Lord Corporation/Film Products Division, Pa.

*Primary Examiner*—John Goodrow
*Assistant Examiner*—Susan Berman
*Attorney, Agent, or Firm*—Henry C. Young, Jr.; Louis F. Kreek, Jr.

[57] ABSTRACT

A tire has on its inner surface on elastomeric air barrier coating, which is formed by photocuring a composition comprising: (a) an end capped prepolymer (MW 2500–10,000) formed by reacting a polyester diol (MW750–1500) with a diisocyanate, and reacting the resulting diisocyanate terminated prepolymer with an end group forming compound; (b) one or more monofunctional addition polymerizable monomers; and (c) a photoinitiator or mixture thereof. In preferred embodiments, the polyester diol is hydroxyl terminated ethylene adipate, the diisocyanate is TDI, and the end group forming compound is 2-hydroxyethyl methacrylate (HEMA). The monofunctional monomer may be or include N-vinyl-pyrrolidone (NVP). The air barrier coating has high elongation, low modulus, good heat aging resistance and good adhesion to the tire in addition to low oxygen permeability.

22 Claims, 4 Drawing Sheets

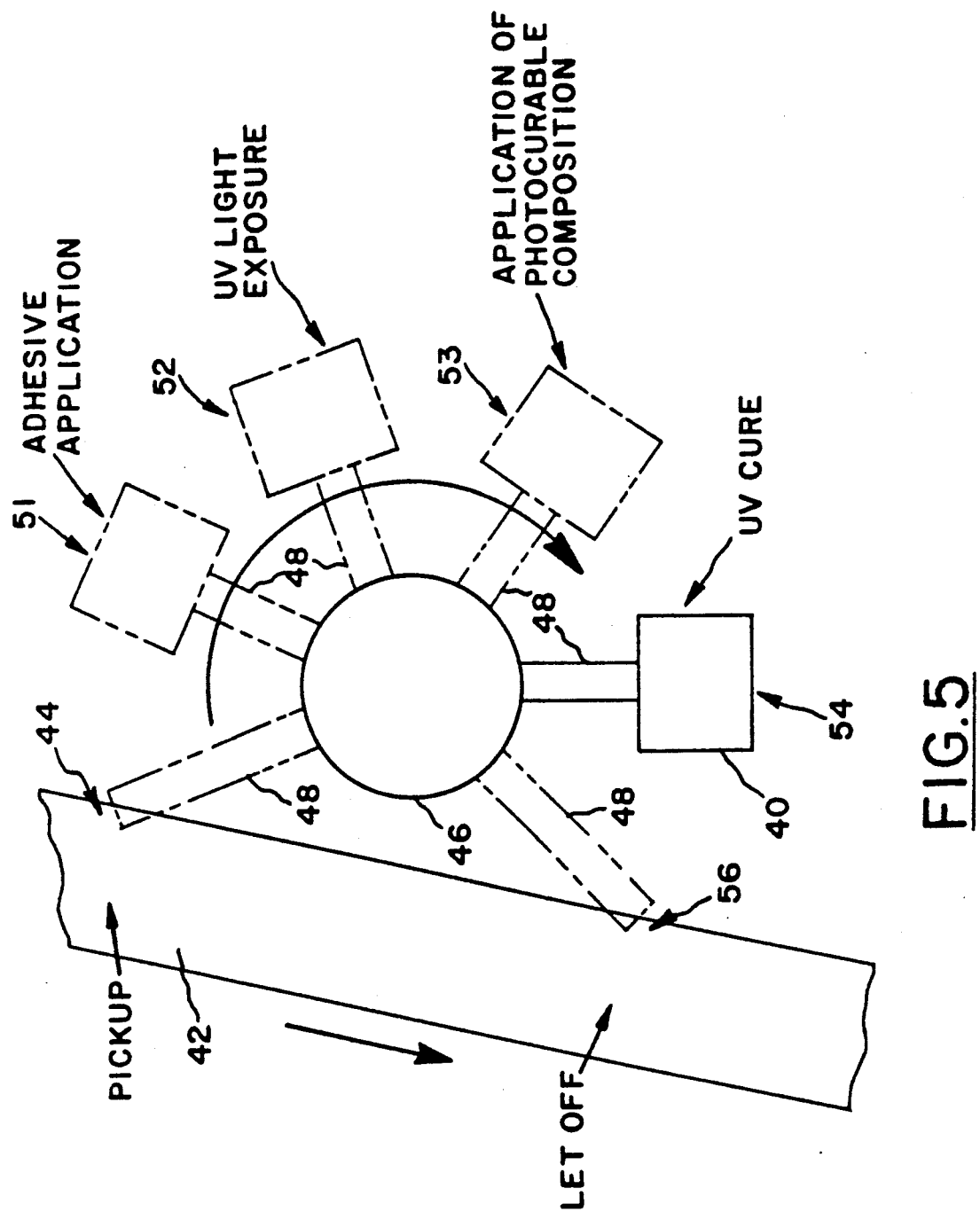

TIRE HAVING RADIATION CURED AIR BARRIER COATING

This application is a division of our co-pending application Ser. No. 07/126,989, filed Nov. 30, 1987, now U.S. Pat. No. 4,874,670, issued Oct. 17, 1989.

TECHNICAL FIELD

This invention relates to rubber tires having inner liners, and to compositions used in the coating of such inner liners. More particularly, this invention relates to rubber tires having as an inner liner coating a photocured elastomer of low air permeability and high elongation.

BACKGROUND ART

The inner surface of a pneumatic rubber tire is typically composed of a rubbery, elastomeric composition designed to prevent or retard the permeation of air and moisture into the carcass from the tire's air chamber. The portion of the tire containing such inner surface is often referred to as an inner liner. Inner liners have been used for many years in tubeless, pneumatic vehicle tires to retard or prevent the escape of air used to inflate the tire, thereby maintaining tire pressure.

Rubbers which are relatively impermeable to air are often used as a major portion of such inner liners. These can include butyl rubber and halobutyl (e.g. chlorobutyl and bromobutyl) rubbers. U.S. Pat. No. 3,808,177 discloses other polymers which may also be relatively impermeable.

The inner liner is normally prepared by conventional calendering or milling techniques to form a strip of uncured compounded rubber. Typically this strip is the first element of the tire to be applied to a tire building drum, over and around which the remainder is built. When the tire is cured, such inner liner becomes an integral, co-cured part of the tire. Other techniques are used in some cases; for example, U.S. Pat. No. 3,299,934 discloses application of a cured polyurethane in the form of a solution to the inner surface of the tire. The polyurethane is a reaction product of a partially diisocyanate-modified polyester prepolymer with a further quantity of diisocyanate and a small amount of castor oil.

Other references disclosing tires having coatings of low air permeability on the inner surface of a tire include Japan published patent application No. 47-31761, published Aug. 15, 1972 (vinylidene chloride copolymers, polyesters and polyamides) and United Kingdom published patent application No. GB 2 023 516 A (polyvinylidene chloride).

Rubber composition based inner liners add both weight and cost to the manufacture of a tire. Relatively thick inner liner coatings are generally necessary to obtain the desired degree of air retention; the added weight and cost are largely attributable to the thickness of coating required.

Photopolymerizable compositions, or photopolymers, have been reported as being useful in the manufacture of various items including printing plates, printing inks and paints among others, but not as coatings for forming pneumatic tire inner liners. Photopolymers comprising polyurethane formed by reaction of a polyhydroxy compound with a diisocyanate and having methacrylate end groups are disclosed, for example, in U.S. Pat. Nos. 3,891,523; 3,912,516; and 4,057,431. These compositions are disclosed as being photopolymerizable, e.g. polymerizable by exposure to actinic light. Nothing is disclosed or taught in any of these references as to either the air permeability or the elongation properties of the resulting photocured resins.

Curing of photopolymers by means of ultraviolet light or electron beam radiation has also been described in the literature. "Radiation Curing: An Introduction to Coatings, Varnishes, Adhesives and Inks", published by the Association for Finishing Processes of the Society of Manufacturing Engineers, Publications/Marketing Division, Dearborn, Mich., described curing by both ultraviolet (UV) and electron beam (EB) radiation, and describes in general terms equipment for both types of radiation processes.

Actinic light generators or lamps are well known and are presently used in photopolymerization. By way of example, U.S. Pat. No. 4,485,332 describes an electrodeless lamp which contains mercury and which emits ultraviolet radiation when excited with microwave energy. Lamps of this type are described as being useful in the curing of coatings or inks by photopolymerization.

Other types of ultraviolet lamps for curing are also known.

U.S. Pat. No. 4,434,372 to Cleland describes an electron beam scattering apparatus and its use in curing tire inner liners.

DISCLOSURE OF THE INVENTION

This invention according to one aspect thereof provides an end capped prepolymer having a molecular weight in the range of about 2,500 to about 10,000, said prepolymer being a reaction product of (1) a polyester diol having a molecular weight in the range of about 700 to about 1,500, and formed by reaction of a alkanediol containing from 2 to about 6 carbon atoms with an aliphatic dicarboxylic acid containing from 2 to 10 carbon atoms; (2) an organic diisocyanate and (3) an addition polymerizable end group compound having one carbon-to-carbon double bond and one hydroxyl group per molecule; wherein the mole ratio of —NCO groups in said diisocyanate to —OH groups in said diol is in the range of about 1.12 to about 1.4; and wherein said end capped prepolymer is prepared by first reacting said polyester diol with said diisocyanate to form a diisocyanate terminated polyester urethane prepolymer comprising alternating units of said polyester and said diisocyanate and containing from about 2.5 to about 8 polyester diol units per mole, and then reacting said isocyanate terminated prepolymer with said end group compound.

This invention according to another aspect provides a radiation curable composition comprising (a) from about 60 to about 90 parts by weight of an end capped prepolymer having the composition described above and (b) from about 40 to about 10 parts by weight of a monofunctional addition polymerizable reactive diluent monomer or mixture thereof, based on 100 parts by weight of end capped prepolymer/reaction diluent monomer mixture. This composition is radiation curable to form a cured elastomer having low air permeability. In particular, there is provided a photocurable composition containing a photoinitiator or mixture thereof in addition to the end capped prepolymer and the reactive diluent monomer or mixture thereof.

This invention according to another aspect provides an elastomer having low air permeability, high elongation and high 100 percent modulus, said elastomer being a reaction product formed by curing of a radiation curable composition (and in particular by photocuring a photocurable composition) as described above.

This invention according to another aspect provides processes for preparing a composite article comprising applying a radiation curable elastomer coating on a rubber substrate, which processes comprises (a) treating a surface of said rubber substrate in order to improve adhesion of said cured elastomer;
(b) applying to said surface a coating of a radiation curable composition of this invention having low air permeability when cured; and
(c) curing said radiation curable composition, to yield a cured elastomer of low air permeability.

In preferred embodiments of this aspect of the invention, radiation curing is effected by means of actinic light (and may be called photocuring) and the radiation curable composition is a photocurable composition having the content indicated above.

The rubber substrate may be either cured or uncured (i.e. green). Uncured substrates are preferred. The preferred substrate is a rubber tire, and in particular a green tire. It is necessary to prepare the surface to be coated in order to obtain good adhesion of the cured elastomer to the substrate. Surface preparation techniques differ, depending on whether the substrate is cured or uncured.

This invention according to another aspect provides for a composite article, in particular, an inflatable elastomeric article and most particularly, a rubber tire comprising (a) a cured rubber substrate and;
(b) a radiation cured elastomeric coating bonded to at least one surface of said rubber substrate. The preferred elastomeric coating is a low oxygen permeability reaction product of a radiation curable composition as described above.

BRIEF DESCRIPTION OF DRAWINGS

In the drawings:

FIG. 5 is a schematic diagram of a system suitable for applying a photocurable composition to either a green tire or a cured tire in accordance with this invention.

PRACTICE OF THE INVENTION

This invention will be described in detail with reference to preferred embodiments thereof.

Figure 1:
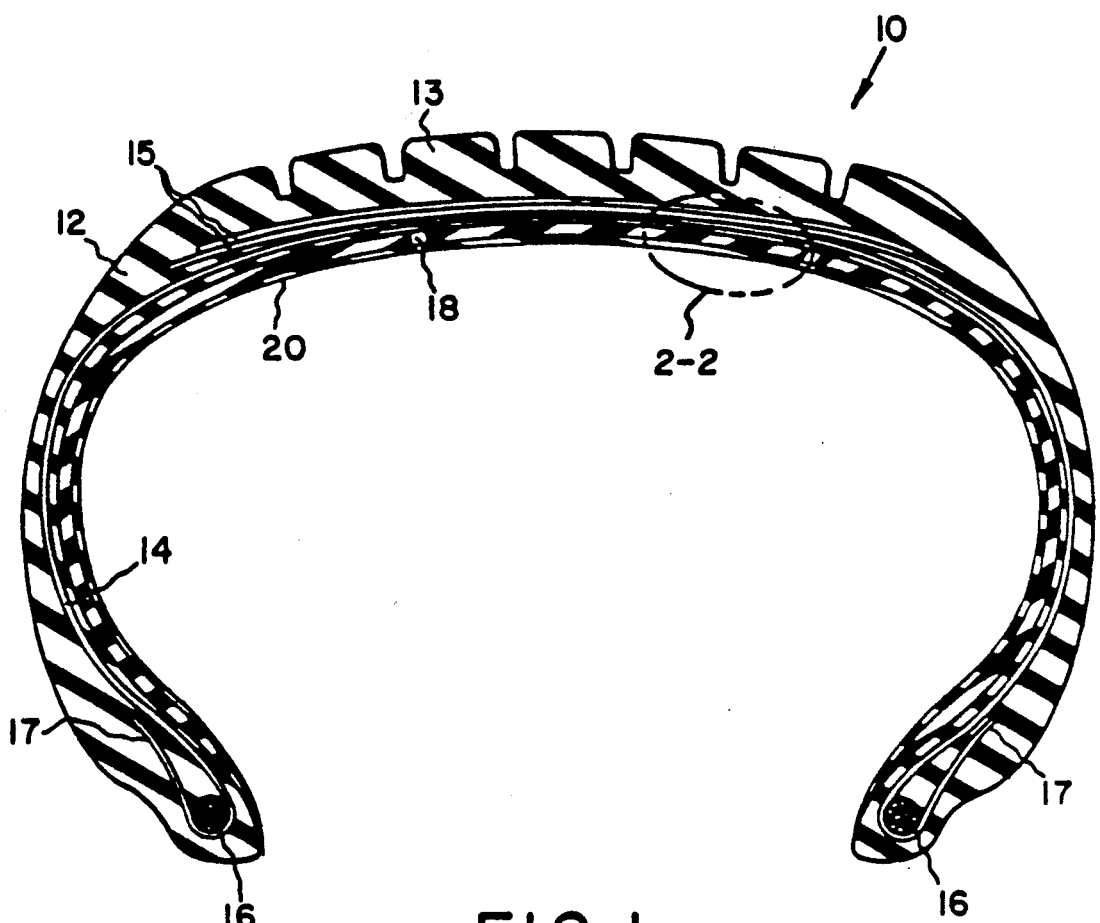
FIG. 1 is a cross-sectional view of a tire having an air barrier coating according to the invention.
Figure 2:
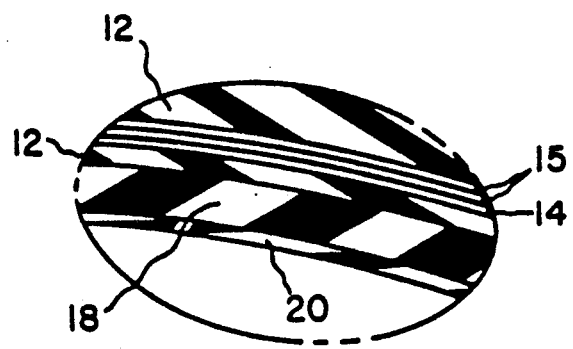
FIG. 2 is an enlarged cross-sectional view of a portion of the tire shown in FIG. 1.

A representative tubeless tire having an air barrier coating according to this invention is shown in FIG. 1. Referring to FIG. 1, 10 is a tubeless tire having carcass 12 and tread 13. Carcass 12 may be reinforced with one or more cords 14 and belt 15. The cord 14 extends around beads 16 and terminates at ends 17 in the tire sidewalls. A cured rubber inner liner 18 may be adhered to the inner surface of carcass 12. This inner liner preferably extends over the entire inner surface of tire 10.

The inner liner is made of a material (e.g., natural rubber, styrene-butadiene rubber (SBR), polybutadiene rubber (PBD) or blends thereof which protects the carcass plies. This liner may be either sulfur or peroxide cured. A butyl or halobutyl inner liner may be used but is not preferred. The tire structure described thus far may be conventional, although the materials for inner liner 18 may differ from those conventionally used.

A thin air barrier coating 20 according to this invention covers the entire inner surface of tire 10. Coating 20 is a radiation cured elastomer (preferably a photocured elastomer) obtained on curing a radiation curable composition as above described. This coating is adhered to inner liner 18 or (where inner liner 18 is omitted) directly to the inner surface of carcass 12. This coating is typically very thin, e.g., it may have a thickness from about 1 to about 20 mils (about 0.001 to about 0.020 inches, or about 0.025 to about 0.51 mm), preferably from about 5 to about 15 mils (0.13 to 0.38 mm). This coating has extremely low air permeability, even compared to inner liner materials now in use. Oxygen permeability of a coating 20 of the invention is about one-third to one-fifth that of a halobutyl inner liner of the same thickness measured under the same conditions. For example, a 10 mil (0.25 mm) coating of this invention has approximately the same air permeability as a 35 mil (0.89 mm) thickess of halobutyl rubber. Oxygen permeability of elastomer coatings of this invention is generally less than about 100 cc-mil/100 in$^2$-day at 30° C. and atmospheric pressure and zero (0) percent relative humidity. In addition, a coating of this invention has high elongation compared to conventional photopolymer formulations, and low modulus and high flex resistance over the entire temperature range which may be encountered by a tire in service. Elastomers of this invention are characterized by elongation of at least 200 percent. The 100 percent modulus value of elastomers of this invention is not higher than about 1,200 pounds per square inch (psi).

Tires having an air barrier coating 20 according to this invention can, if desired be lighter in weight and lower in cost than conventional tubeless tires having a halobutyl inner liner. The very low air permeability of radiation cured elastomers of this invention makes it possible to make coating 20 much thinner than the thickness of a conventional halobutyl rubber inner liner. The air barrier coating of this invention also makes it possible to use a material having desirable mechanical properties irrespective of air permeability as the material for inner liner 18. Rubber tires of this invention may have lower air permeability, or lower weight and cost, or both, than rubber tires presently in use. In addition to the potential enhancement of the fuel economy and cost savings incident upon the lighter weight, the thinner sidewall also has the potential mechanical advantages of reduced rolling resistance.

The combination of very low oxygen permeability and high elongation exhibited by elastomers of this invention is believed to be unique. In addition, the elastomers of this invention have satisfactory heat aging characteristics. Elastomer coatings 20 of this invention have good adhesion to rubber when the rubber substrate surface (e.g. inner liner 18, or carcass 12 when inner liner 18 is omitted) is properly pretreated to improve adhesion of the coating to the substrate.

The tire carcass 12 may be of conventional cured rubber, or a cured mixture thereof, such as for example natural rubber, synthetic natural rubber, (synthetic cis- 1,4-polyisoprene), cis 1,4-polybutadiene, or styrene/butadiene copolymer (SBR). It is to be understood that such rubbers are compounded with typical rubber compounding ingredients which conventionally include carbon black, zinc oxide, stearate or stearic acid, sulfur, accelerator(s) and optionally, rubber processing oil. Other ingredients might be used such as various antidegradants, pigments and conventional other compounding ingredients.

PHOTOPOLYMER AND ITS PREPARATION

The end capped prepolymer, or photopolymer, utilized in this invention is prepared by first preparing a polyester diol, reacting this polyester diol with an organic diisocyanate to extend the chain length and form an isocyanate terminated prepolymer and reacting this prepolymer with an addition polymerizable end group compound having one carbon-to-carbon double bond and one hydroxyl group per molecule (preferably a hydroxyalkyl acrylate or methacrylate), to form an end capped prepolymer. This end capped prepolymer, or photopolymer, is an oligomer having a molecular weight in the range of about 2,500 to about 10,000.

The first step in the preparation of the end capped prepolymer is to prepare a polyester diol. This polyester diol is a hydroxyl terminated polyester having a molecular weight of about 700 to about 1500, preferably from about 750 to about 1200, and hydroxyl groups at each end of the molecule (i.e. 2 hydroxyl groups per molecule). The polyester diol is formed by the reaction of an alkanediol having 2 to about 6 carbon atoms with an aliphatic dicarboxylic acid having from 3 to about 10 carbon atoms per molecule. The alkanediol is present in slight excess, e.g. about 1.12 to about 1.40 moles per mole of dicarboxylic acid so that the polyester has free hydroxyl groups at each end. Where m is the number of acid groups per mole, the number of alkyldioxy groups is m+1, and the mole ratio of alkanediol to dicarboxylic acid is (m+1)/m. The reaction may be carried out under known polyester-forming conditions. The alkanediol may be an aliphatic diol having from 2 to about 6 carbon atoms such as for example, ethylene glycol, 1,3-propanediol, 1,4-butanediol, 1,5-pentanediol, 1,6-hexanediol, 1,3-butanediol, 2,2-dimethyl-1,3-propanediol, diethylene glycol, dipropylene glycol, dibutylene glycol or the like. Ethylene glycol is preferred. Minor amounts of higher polyols (e.g., triols and tetrols) may be present but are not preferred. Mixtures of two or more diols may be reacted with the acid or acids. The dicarboxylic acid may be a saturated aliphatic carboxylic acid having from about 3 to about 10 carbon atoms, such as malonic acid, succinic acid (1,4-butanedioic acid), glutaric acid (1,5-pentanedioic acid) or adipic acid (1,6-hexanedioic acid). Adipic acid is preferred. More than one acid may be reacted with one or more diols although, in practice, usually only one acid is used. Minor amounts of aromatic dicarboxylic acid may be present, but these ordinarily should constitute no more than about 10 mole percent (and preferably less) of the total dicarboxylic acid present.

The functionality of the polyester diol is preferably 2 and should not exceed 2.2. Functionality higher than 2 results when part of the polyol content undergoing esterification is in the form of polyols having more than 2 hydroxyl radicals per molecule (e.g., triols and tetrols).

The preferred polyester diol is polyethylene adipate, with two terminal hydroxyl groups.

The polyester diol (or hydroxyl terminated polyester) is reacted with an organic diisocyanate or mixture of organic diisocyanates to form an isocyanate terminated urethane prepolymer (or simply a prepolymer). Suitable diisocyanates include, for example, 2,4-toluene diisocyanate, 2,6-toluene diisocyanate, meta-xylene diisocyanate, para-xylene diisocyanate, 3,3'-ditoluene-4,4'-diisocyanate, diphenylmethane-4,4'-diisocyanate, 3,3'-dimethyldiphenylmethane-4,4'-diisocyanate, 2,4-toluene diisocyanate dimer, 1,5-naphthylene diisocyanate, 1,6-hexamethylene diisocyanate and dicyclohexylmethane-4,4'-diisocyanate and, optionally, mixtures thereof. The preferred diisocyanate is TDI (toluene diisocyanate), which is a commercial mixture typically composed of about 95-98 percent of 2,4-toluene diisocyanate and about 2-5 percent of 2,6-toluene diisocyanate. Mixtures of diisocyanates can be used. Triisocyanates and higher poly isocyanates are preferably absent or present in only minimal amounts since the prepolymer should have a functionality not above 2.2 and preferably not above 2.1. A functionality of 2 is preferred. The diisocyanate is present in slight excess of the polymeric polyester diol; that is, the mole ratio of —NCO groups in the diisocyanate to —OH groups in the polyester diol is from about 1.12 to about 1.4. Reaction conditions and the diisocyanate/polyester diol mole ratio are such that the isocyanate terminated urethane prepolymer obtained has a short chain length, i.e. about 2.5 to about 8 polyester diol units, preferably from about 4 to about 6 polyester diol units per mole of prepolymer. The number of polyester diol units per mole of prepolymer may be called the chain extension ratio. The number of diisocyanate units is correspondingly from about 3.5 to about 9 units per mole (the number of diisocyanate units is always one greater than the number of polyester diol units). Where n is the number of polyester diol units in a chain, n+1 is the number of diisocyanate units in the chain, and the required diisocyanate/polyester diol mole ratio is (n+1)/n. Also, n is the chain extension ratio. This prepolymer is an alternating copolymer which is understood to be essentially linear in form (although some branching in the molecular chain may occur) consisting of alternating polyester diol and isocyanate groups, with isocyanate groups at each end.

An end group compound is reacted with the isocyanate terminated prepolymer to form an end capped prepolymer, which may also be called a photopolymer. This end group compound is an addition polymerizable unsaturated compound having one double bond and one hydroxyl group per molecule. Especially preferred end group compounds are the hydroxyalkyl acrylates and hydroxyalkyl methacrylates in which the said alkyl radical contains from 1 to about 6 carbon atoms. An especially preferred end group compound is 2-hydroxyethyl methacrylate (HEMA). The amount of end group compound is at least 95 percent, preferably from 95 to 105 percent, of the quantity which is equivalent to the free isocyanate (i.e., NCO) content of the isocyanate terminated prepolymer. Thus, when the isocyanate terminated prepolymer has a functionality of exactly 2, two moles of end group compound react with each mole of prepolymer. A small amount of stabilizer (no more than about 0.5 percent by weight) such as p-methoxyphenol is included. An end capped prepolymer having two carbon-to-carbon double bonds per molecule, and an average urethane chain extension value of about 2.5 to about 8 is obtained. A small quantity of free hydroxyl groups in the end capped prepolymer is acceptable. The end capped prepolymer is terminated at each end with a hydroxyalkyl methacrylate or other end group compounds as described above. The molecular weight of the end capped prepolymer may be in the range of about 2,500 to about 10,000. The end capped prepolymer is a liquid at ordinary temperatures and pressures. The viscosity of the end capped prepolymer depends on its molecular weight and the chain extension value. The maximum molecular weight is such that the viscosity will not be too high for ease in handling. It is important to have the degree of urethane chain extension, as well as the polyester diol average molecular weight, within the ranges specified, so that the cured elastomer ultimately obtained has both the desired elongation and the desired low air permeability. The end capped prepolymer is a bifunctional addition polymerizable compound.

Polyester diol and end capped prepolymer molecular weights, and chain extension ratios represent average values throughout this specification and claims.

COMPOUNDING OF PHOTOPOLYMER

An end capped prepolymer prepared as described above is compounded with one or more monofunctional addition polymerizable reactive diluent monomers, and one or more photoinitiators to form a radiation curable (preferably a photocurable) composition; the ingredients may be dissolved or otherwise dispersed in each other. The photocurable composition may also be called a photopolymer formulation. The photoinitiator can be omitted when electron beam or gamma radiation is used. Other ingredients, such as a chain transfer agent and an adhesion promoter, may be added.

A preferred reactive diluent monomer is N-vinylpyrrolidone (NVP) because photocurable compositions containing NVP in general yield tougher elastomers than do otherwise similar photocurable compositions in which NVP is absent. One or more additional monofunctional monomers, herein referred to as comonomers, may also be included in the photocurable composition in addition to NVP. Suitable comonomers include mono-acrylates and mono-methacrylates having a polar side chain, such as 2-ethyl methacrylate and polypropylene glycol monomethacrylate (PPGMM) and 3-chloro-2-hydroxy-propylmethacrylate. The presence of one or more comonomers having a polar side chain improves modulus of the final product while minimally affecting permeability. Small amounts of non-polar monofunctional comonomers may also be included in order to improve the wetting properties on rubber. NVP, when present, typically constitutes more than one-half of the total reactive monomer content on a weight basis.

The amounts of end capped prepolymer and reactive diluent monomer are in the range of about 60 to about 90 parts by weight of end capped prepolymer and conversely from about 40 to about 10 parts by weight of reactive diluent monomer or mixture thereof, both based on 100 parts combined weight of end capped prepolymer and reactive diluent monomers, i.e. 100 phr. The sum of the weights of end capped prepolymer and reactive diluent monomer(s) is taken as 100 parts by weight, and the amounts of all ingredients in the radiation curable composition are based on this sum unless expressly stated otherwise. The amount of comonomer may be in the range of 0 to about 50 percent of the total reactive diluent monomer weight.

It will be noted that an excess of reactive diluent monomer is always present. Thus, a composition containing 90 parts by weight of end capped prepolymer having a molecular weight of 2,500 (and therefore an equivalent weight of 1250) and 10 parts of N-vinylpyrrolidone (molecular weight = 111) contains 0.090 equivalents of NVP and 0.072 equivalents of end capped prepolymer (i.e., 1.25 equivalents of NVP per equivalent of prepolymer). As either the proportion of NVP or the molecular weight of the end capped prepolymer becomes greater, the equivalent ratio of NVP to end capped prepolymer becomes greater.

More typically, the equivalent ratio of reactive diluent monomer (or mixture thereof) to end capped prepolymer will be from about 3 to about 8.

The amounts of end capped prepolymer and reactive diluent monomer(s) may be expressed mathematically as follows:

Let A = parts by weight of end capped prepolymer
Let B = parts by weight of the first
    reactive diluent monomer (e.g., NVP)
Let C = parts by weight of comonomer(s)
Then: (1) A + B + C = 100
    (2) A = 60 to 90
    (3) B + C = 10 to 40
When NVP is the first reactive diluent monomer:
    (4) C = 0 to 0.5 (B + C)

The photoinitiator is an essential ingredient of UV curable formulations, providing high energy free radicals under the influence of actinic radiation to initiate polymerization. Numerous photoinitiators are known in the art. These include, for example, benzoin and derivatives thereof such as benzoin, benzoin methyl ether, benzoin ethyl ether, benzoin butyl ether and alpha-methyl benzoin, diketones such as benzyl and diacetyl; phosphines such as triphenylphosphine (TPP); organic sulfides such as diphenylmonosulfide, diphenyldisulfide and tetramethylthiuram monosulfide; S-acyldithiocarbamate, such as S-benzoyl-N,N-dimethyldithiocarbamate and S-(t-chlorobenzoyl)-N,N-dimethyldithiocarbamate; phenones such as acetophenone, benzophenone and derivatives thereof, and 2-naphthalene sulfonyl chloride and derivatives thereof mixtures can be used. A preferred photoinitiator system is mixture of 2,2-dimethoxy-2-phenylacetophenone and benzophenone.

One or more chain transfer agents is preferably included in the photocurable composition (which may also be called a photopolymer formulation), in order to improve the 100 percent modulus of the cured photopolymer. Secondary alcohols containing from 3 to about 10 carbon atoms (including mixtures thereof) are preferred chain transfer agents. Isopropyl alcohol is a particularly preferred chain transfer agent. Other secondary alcohols include 2-butanol, 2-pentanol, cyclohexanol, 2-heptanol, and 2,6-dimethyl-4-heptanol. Other (but generally less desirable) chain transfer agents include mercaptans, amines and organic halides. The total amount of chain transfer agent or mixture thereof may be in the range of about 0.5 to about 10 phr. In addition, the amount of chain transfer agent or mixture thereof should not exceed 25 percent of the weight of reactive diluent monomer(s). In mathematical terms, let D = the parts by weight of chain transfer agent or mixture thereof. Then:

$$D = (0.005 \text{ to } 0.1)(A + B + C) \qquad (5)$$

$$D = 0.25(B+C) \tag{6}$$

One or more stabilizers may be present in the photocurable composition in order to inhibit polymerization or curing prior to exposure to radiation. Triphenylphosphine (TPP) is a preferred stabilizer. TPP has been found effective in amounts of about one part by weight per 100 parts of end capped prepolymer/reactive monomer mixture, although larger or smaller amounts can be used.

An adhesion improving reactive monomer, e.g., isocyanatoethyl methacrylate (IEM) is preferably present in photocurable compositions to be applied to cured rubber substrates, in order to improve adhesion of the photopolymer composition to the substrate. The substrate is typically the inner wall of a tire such as tire 10 in FIG. 1. The amount required is typically about 0.5 to about 10 parts of end capped prepolymer/reactive diluent monomer mixture.

It is important that the polyester diol have a molecular weight in the range of about 700 to about 1500 as described above, in order that the cured photopolymer will have low air permeability, high elongation and acceptable 100 percent modulus. If the molecular weight of the diol is below about 750, the cured product will have low air permeability but will also have low elongation, so that it would soon crack in service due to the normal flexing of a tire. On the other hand, if the polyester diol molecular weight is over about 1500, the cured polymer will have high elongation, but the air permeability is unacceptably high although usually still lower than the air permeabilities of bromobutyl linings now in use. The preferred polyester diol molecular weight (or polyester molecular weight) is from about 750 to about 1200.

It is also important for the prepolymer to have at least 2.5 polyester diol units or chains in each prepolymer unit or chain. In other words, the urethane chain extension ratio must be at least 2.5. The urethane chain extension ratio should not exceed 8. The preferred chain extension ratio is from 4 to 6. This range is necessary so that the cured polymer will have both good elongation and low air permeability.

Radiation curable compositions as described herein when cured yield elastomers of low oxygen permeability, high elongation and low 100 percent modulus as previously described. Preferred elastomers are those having an oxygen permeability not over 100 cc-mil/100 sq. in.-day measured at 0 percent relative humidity, a 100 percent modulus not over 1200 pounds per square inch (psi), and an ultimate elongation of at least 200 percent. While there are numerous trade-offs in compounding a photopolymer in order to achieve these properties, these properties are most frequently achieved when the photopolymer has the preferred polyester molecular weight of about 750–1200 and the preferred chain extension ratio of about 4–6, and when the photopolymer formulation contains a secondary alcohol such as isopropenol as a chain transfer agent.

While applicants do not wish to be bound to any theory, it is believed that the combination of very low oxygen permeability and high elongation is due to a combination of formation of interpenetrating networks or semi-interpenetrating networks due to cross-linking, hydrogen bonding between active hydrogen atoms on adjacent polymer chains, which provides greater elongation at equivalent oxygen barrier properties.

APPLICATION TO RUBBER SUBSTRATE

The radiation curable composition according to this invention may be coated on at least one surface of a substrate by conventional techniques, such as spraying, brushing or melt coating, and then cured by means of actinic light. The coating thickness is such as to give an elastomeric film of desired thickness. Photocuring gives a sheet or film of the cured elastomeric photopolymer, which has the above-indicated characteristics of low air permeability, high elongation and low 100 percent modulus. However, whether the substrate is uncured or cured rubber, e.g. either a green tire or a cured tire, adhesion of the coating to the substrate after cure is generally unsatisfactory unless the substrate surface is first treated in order to improve adhesion. Preferred processes for preparing a tire with an air barrier coating according to this invention, such as is shown in FIG. 1, will now be described in detail.

CURED TIRE

Figure 3:
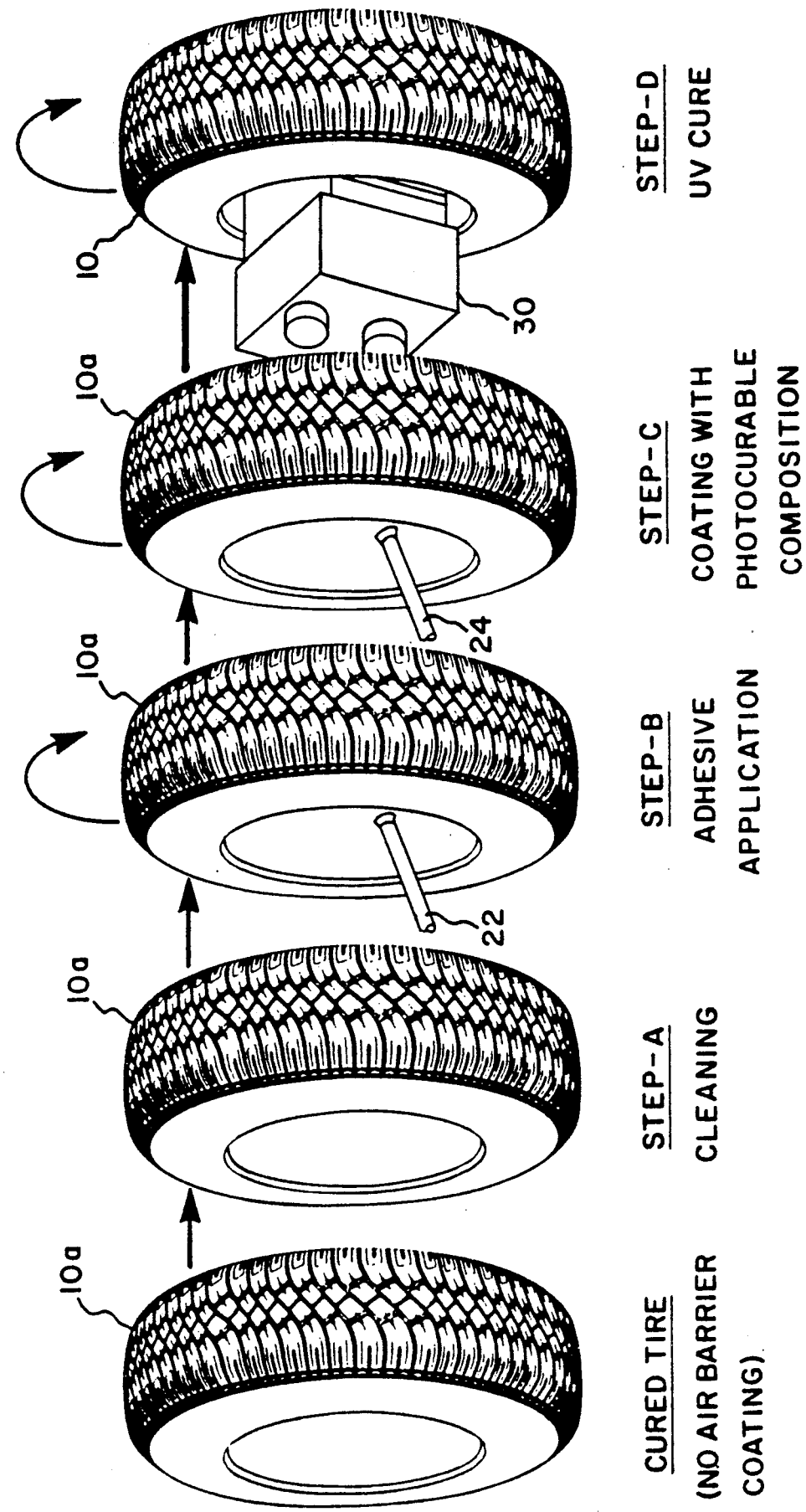
FIG. 3 is a schematic flow diagram of a first process according to this invention, in which a photocurable coating is applied to an inner surface of a cured tire.

Application of a coating to a cured tire according to this invention will now be described with particular reference to FIG. 3. Referring now to FIG. 3, the steps of applying an elastomeric air barrier coating to a cured tire comprises the steps of (A) cleaning the inner (or concave) surface of a tire 10a (which may be structurally like tire 10 shown in FIG. 1 except for the absence of an air barrier coating 20); (B) applying an adhesive material to the cleaned inside surface of the tire; (C) applying a photocurable composition of this invention to the adhesive coated inner surface of the tire; and (D) photocuring the photocurable composition to form the elastomeric coating on the inner surface of the tire.

Cleaning of the inner surface of a tire can be done by various means such as organic solvent or aqueous soap solution washing, abrading, or a combination thereof, as more fully disclosed in European Patent Publication No. 0157717, published Oct. 9, 1985. If an aqueous soap solution or an organic solvent is used, the surface must be dried before proceeding further.

Next, an adhesive material dispersed in a volatile liquid organic medium is applied, as shown in step B. Adhesive application may be according to the aforementioned European Patent Publication No. 0157717, in which application of "Chemlok" 7701, which is understood to be a 3 percent solution of trichloroisocyanuric acid (TCIA) in ethyl acetate, made by Hughson Chemicals, Lord Corporation, Erie, PA is followed by application of a phenol formaldehyde resole resin in an organic solvent (e.g. "Chemlok" 218, which is understood to be a 50 percent solution of a phenol formaldehyde resole resin in methyl ethyl ketone, made by Hughson Chemicals), with drying of the solvent after each step. The TC1A solution serves as a primer and the phenol formaldehyde resole resin solution is an adhesive. Other adhesives may be used. A preferred adhesive solution is a solution of phenol formaldehyde resin (e.g., "Chemlok 218"), an epoxy resin (e.g. "Epon 828", which is understood to be a condensation product of epichlorohydrin and bisphenol A, obtainable from Shell Chemical Company) and a polyamide (e.g., "Versamid 140", obtainable from Henkel) in methyl ethyl ketone (MEK). Optionally, "Chemlok" 218" may be replaced by "Hycar" ATBN 1300×16, which is an amine terminated butadiene/acrylonitrile copolymer obtainable from B. F. Goodrich Co. (Chemical Division) of Akron, Ohio. Application of this adhesive should also be preceded by application of TC1A solution. Other adhesives may be used. The adhesive must be capable of bonding both to the substrate and to the radiation curable composition which is subsequently applied. The adhesive solution or dispersion may be applied by conventional techniques, as for example by spraying, e.g. through nozzle 22. The primer and dried adhesive form a thin layer on the surface of the tire. This lays an intermediate layer between inner liner 18 (or carcass 12 when inner liner 18 is absent) and air barrier coating 20 in the finished tire.

Next, a radiation curable composition, preferably a photocurable composition (or photopolymer formulation) of this invention, is applied, as shown in Step C. This may be done by conventional techniques, as for example airless spraying through nozzle 24 or by brushing or extrusion coating using a narrow slit die. As the tire is rotated, the die is indexed over the surface to obtain overlapping film coatings. The photocurable compositions of this invention are viscous liquids at ordinary temperatures. They are applied in bulk, but may be heated to reduce their viscosity to facilitate application.

The photopolymer formulation is cured by the application of actinic light from an actinic light emitting device 30, as shown diagramatically in Step D of FIG. 3. "Actinic light" as used herein embraces ultraviolet (UV) light and visible light near the violet end of the spectrum. The wavelength spectrum for the purposes of this invention typically ranges from about 200 to about 450 nanometers. Suitable actinic light emitting devices or lamps are well known in the art. These include medium pressure mercury vapor lamps, electrodeless lamps, pulsed xenon lamps, and hybrid xenon/mercury vapor lamps. One lamp included, for example, is that shown in U.S. Pat. No. 4,507,587 (and assigned to Fusion Systems Corporation of Rockville, Md.). The lamp shown therein is an electrodeless mercury vapor lamp, which is the preferred type of actinic light emitting device for the purpose of this invention. A preferred arrangement comprises one or more lamps together with a reflector of suitable shape which will diffuse radiation substantially evenly over the entire surface to be irradiated. The radiation dosage must be sufficient to cure the photopolymer compound. Ultraviolet radiation dosage of at least about 10 joules per square centimeter (joules $cm^2$) and preferably at least about 12 joules per square centimeter is sufficient for the required cure. Usually the dosage will not exceed about 15 joules/$cm^2$. The required amount can be readily determined by irradiating test samples comprising a small piece of flat cured rubber coated on one side with a photocurable composition of this invention, and measuring physical properties (e.g., tensile strength and elongation) after cure. Test samples of photocured unsupported elastomer film of this invention can also be used for physical measurements. The cured product is an elastomer film of very low air permeability, shown as coating 20 in FIG. 1, which is adherently bonded to the inner surface of tire 10 or other rubber substrate, as the case may be. An air barrier coating can also be applied to the inner surface of a green tire according to this invention.

GREEN TIRE

Figure 4:
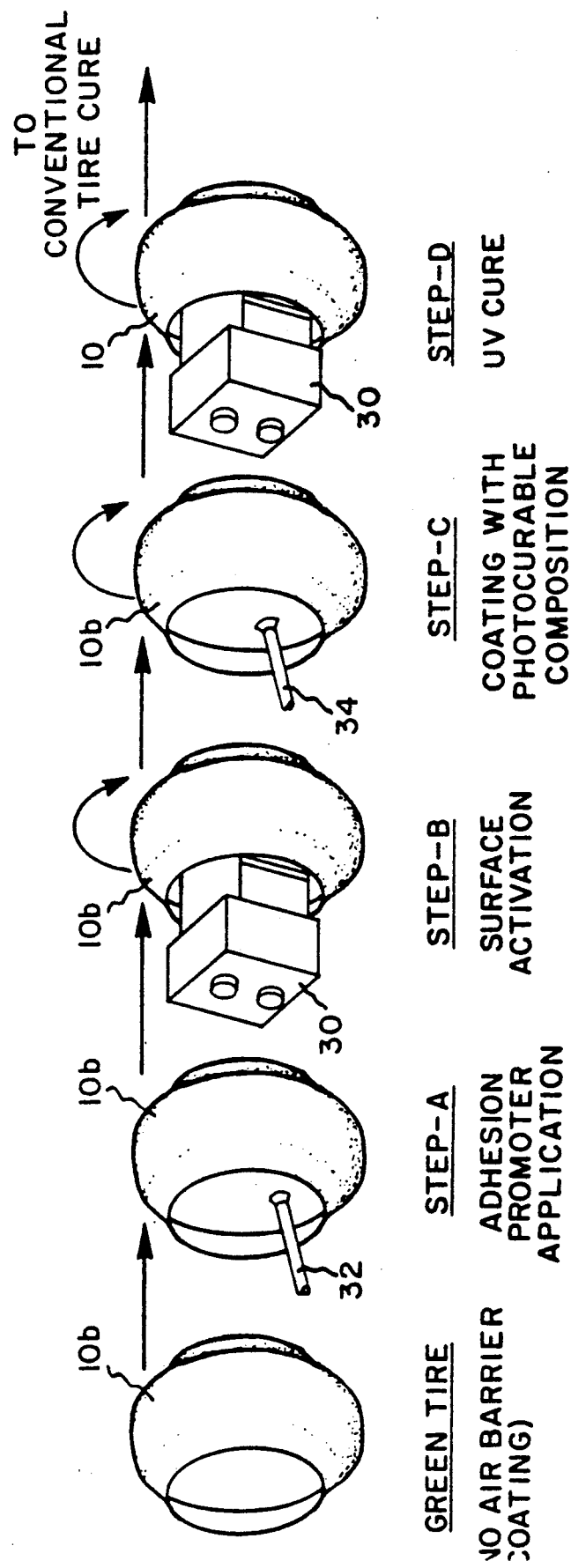
FIG. 4 is a schematic flow diagram of a process according to a second embodiment of this invention, in which a photocurable coating is applied to the inner surface of a green tire.

Application of an air barrier coating to a green tire according to this invention is shown schematically in FIG. 4. Referring to FIG. 4, a process for forming an air barrier coating on a green tire comprises the steps of (A) applying an adhesion promoting material via nozzle 32 to the inner surface of the green tire (it is not necessary to clean this surface first); (B) activating the surface with actinic light emitted from actinic light source 30; (C) applying a coating of a radiation curable composition, preferably a photocurable composition of this invention to the inner surface of the green tire via nozzle 34; (D) curing the photocurable composition, e.g. by means of actinic light; and (E) (not shown in FIG. 4) curing the tire, (i.e. carcass and tread) preferably by conventional means which includes the application of heat and pressure.

Materials used for promoting adhesion of a photocurable composition to a green rubber substrate vary, depending on whether the rubber substrate contains sulfur curatives or peroxide curatives.

An adhesion promoting material for application to the inner surface of a sulfur curable green tire in step (A), is "Chemlok" 7701, which is understood to be a 3 percent solution of trichloroisocyanuric acid (TCIA) in ethyl acetate, available from Hughson Chemical of Lord Corp. as indicated earlier. This material serves as a primer which promotes better adhesion of the cured elastomer coating 20 to the tire.

Another suitable adhesion promoting material for application to green tire surfaces comprises a combination of a primer and one or more addition polymerizable reactive monomers. The primer may be TCIA. Preferred reactive monomers for the purpose are acrylates and methacrylates of long chain alcohols. By way of example, such an adhesion promoting material may contain 3 percent by weight of TCIA and 10 percent by weight each of "Sartomer C-2000", which is believed to be a mixture of diacrylates of $C_{14}$ and $C_{15}$ aliphatic glycols, obtainable from Sartomer Company, and 2-ethylhexyl acrylate (2-EHA).

Application of a primer and subsequent UV irradiation activates the rubber tire surface. While applicants do not wish to be bound by any theory, it is believed that UV radiation causes free radical grafting of chlorine in TCIA with unsaturated groups in the green rubber. It is further believed that the TCIA (and reactive monomers when present) forms a very thin intermediate layer between the tire inner liner or carcass and coating 20 in the finished tire. In any case, applicants have found it essential to pretreat the rubber surface to be coated, prior to application and curing of a photocurable composition, in order to obtain good adhesion between the cured elastomer coating 20 (which is formed on curing of the photocurable composition) and the rubber substrate.

The preferred adhesion promoting material for application to the inner surface of a peroxide curable green tire is a surface treatment composition containing a reactive addition polymerizable monomer or mixture thereof. In particular, the reactive monomer may be a monoacrylate or monomethacrylate of an alcohol, which may be either an aliphatic, cycloaliphatic or aromatic (preferably aliphatic) monohydric or dihydric alcohol containing from about 8 to about 18 carbon atoms. The alcohol is typically an ether alcohol, an alkanol or an alkanediol, but may be an alkyl substituted derivative of phenol or hydroquinone. Suitable reactive monomers for surface treatment include 2-ethylhexyl acrylate (2 EHA), dicyclopentenyloxyethyl acrylate (DPOA) (obtainable under the tradename "QM-672" from Rohm and Haas Company), and a diacrylate of a $C_{14}$ aliphatic diol (which may also contain diacrylates of $C_{15}$ and $C_{16}$ diols; available under the tradename "C-2000" from Sartomer Company, a subsidiary of Atlantic Richfield Co. The surface treatment composition also contains a photoinitiator or mixture thereof, such as "Irgacure" 1651 and benzophenone, and may also contain a stabilizer, such as triphenylphosphine (TPP).

It is believed that application of a surface treatment composition as above described followed by UV irradiation activates and modifies the rubber substrate surface so that the cured elastomer coating 20 (applied and cured subsequently) adheres well to the rubber substrate in the finished tire. It is also believed that the surface treatment composition is subsequently cured to form a very thin layer between elastomer coating 20 and the substrate in the finished tire. In any case, surface pretreatment is essential to the obtaining of good adhesion.

This adhesion promoting system is effective for application to peroxide cured rubber substrates; no sulfur or sulfur accelerators may be present. A typical adhesion promoting agent system according to this embodiment contains 10 to 50 parts by weight each of 2EHA, DPOA, and "C-2000", plus 5 parts by weight of photoinitiator (Irgacure 651,) based on 100 parts by weight of reactive monomers.

Actinic light emitting devices of a type known in the art may be used for activation of the inner surface of the tire (step B). Best results are obtained using an electrodeless lamp, e.g. of the type shown in U.S. Pat. No. 4,485,332 to Ury et al, with a suitable reflector so that radiation is diffused substantially evenly over the entire inner surface of the green tire. Acceptable adhesion is obtained at radiation dosages of at least about 2.5 joules per square centimeter and preferably at least about 3.9 joules per square centimeter.

Application of a photocurable composition (Step C) and subsequent photocuring (Step D) may be as described above. Photocurable compositions for application to green tires, unlike those for application to cured tires (which contain IEM as an adhesion-promoting reactive monomer), do not require the presence of any adhesion-promoting ingredients. Actinic light emitting devices of the type used for pretreatment of the green tire for purposes of activation may also be used for photocuring the photocurable composition (or photopolymer formulation) applied in Step C. Radiation dosages required for photocuring can be less than those required for green rubber surface activation, e.g. at least about 10 joules/cm$^2$ (although higher dosages are permissible).

Photocuring of the photocurable composition yields an elastomer film coating of low oxygen permeability. The elastomer coating is adhered to the substrate through the surface which was modified to improve adhesion of the coating to the substrate. Finally, the tire is cured by conventional means (application of heat and pressure) in a tire mold in Step E.

GENERAL

A preferred process for applying an air barrier coating to a green tire is shown schematically in FIG. 5. Referring to FIG. 5, a green tire 40 travels along conveyor belt 42 in the direction of the arrow until it reaches pickup location 44. At this point the green tire is picked up by a multiple armed rotary robot conveyor device 46. For the sake of clarity and simplicity, only one arm 48 of conveyor device 46 is shown. Green tire 40, supported on arm 48, is moved successively through work stations 51, 52, 53 and 54 by clockwise rotation of the conveyor device 46. Four work stations are shown, more or fewer stages may be used in actual practice. At each work station, the conveyor device 46 pauses and the green tire is rotated about its axis, which is aligned with the axis of arm 48, while the operation at that work station is performed. When the operation at each work station is complete, conveyor device 46 transports green tire 40 to the next work station.

An adhesion promoting agent in liquid form is applied to the inner surface of the green tire at first work station 51 while the tire is rotated about its axis, which is also the axis of arm 48. The conveyor device 46 is stationary while this operation takes place. When application of the adhesion promoting agent is complete, the conveyor device 46 resumes rotation until the green tire 40 reaches second work station 52. The inner surface of the green tire is exposed to actinic light (e.g., ultraviolet light) at second work station 52 in order to prepare the tire surface to receive a photocurable composition. The tire is then conveyed to third work station 53, where a coating of a photocurable composition of this invention is applied to the inner surface of the tire as the tire is rotated about its axis. Then the green tire is conveyed to the fourth and final work station 54. The photocurable composition is cured by exposure to actinic light as the tire rotates about its axis at work station 54. After cure of the photocurable composition is complete, the green tire 40 is transported to let off location 56, where the green tire is let off the conveyor device and transferred back to conveyor belt 42. The tire then continues on conveyor belt 42 to a location (not shown) at which it is removed from the conveyor belt and transferred to a tire curing mold, where the remainder of the tire (i.e., the carcass and tread) may be cured by conventional means, i.e. by application of heat and pressure.

The system shown schematically in FIG. 5 can also be used to apply an air barrier coating to a cured tire. Referring once again to FIG. 5, a cured tire 40 travels along conveyor belt 42 in the direction of the arrow until it reaches pickup location 44. The cured tire is transferred to rotary conveyor device 46. In this case a primer may be applied at first work station 51, an adhesive may be applied at second work station 52, a photocurable composition may be applied at third work station 53, and the photocurable composition may be cured by actinic light at fourth work station 54. The first and second work stations 51 and 52, respectively, may be provided with dryers, e.g. hot air dryers or infra-red heat lamps, to dry the primer and the adhesive respectively. The tire 40 is rotated at each work station, and moved from one work station to the next, in the manner described above. After the photocurable composition is cured, the tire 40 is transferred back to conveyor belt 42. At this point the tire building process is complete.

MODIFICATIONS

Various alternatives and modifications are permissible without departing from the scope and spirit of this invention.

While this invention has been described with particular reference to forming low air permeability coatings on rubber tires and particularly on tubeless rubber tires, it is equally applicable to convenience spares. For the purposes of this invention, "tire" shall include convenience spares. Other composite rubber articles can also be provided with a lining of low permeability and high modulus according to this invention. Thus, for example, a flat rubber sheet may be provided with a cured photopolymer lining on one or both sides thereof, and the sheet can then be formed into an inner tube, bellows, diaphragm, or other desired rubber article. The photopolymer lining can be on either the inside or the outside of the finished article. Certain details of the photocuring step require modification when a photocurable coating is applied to a flat rubber substrate. In particular, it is preferable to use a plurality of actinic light emitting lamps, distributed over the width of the flat rubber substrate, instead of a single lamp which would ordinarily suffice when irradiating a tire. Other aspects of the process, such as suitable photocurable compositions, compositions and procedures for surface pretreatment in order to improve adhesion, and radiation dosages expressed in joules per square centimeter, remain the same.

The processes disclosed herein for applying a photocurable composition to a rubber substrate, and curing the composition by means of actinic light to form a photocured elastomer coating on the substrate, can be practiced with photocurable compositions generally and not just with the photocurable compositions of this invention. In particular, a photocurable composition may be applied to a surface of a green rubber substrate which has been pretreated as above described to improve adhesion, and UV cured in place to form a cured elastomer coating. The substrate may be either a green tire or other rubber substrate. The elastomer coating is adhered to the substrate through the surface which was treated and modified to improve adhesion of the coating. This method is a convenient method for forming composite elastomeric articles or laminates in which two or more elastomeric layers are joined together.

The preferred means of radiation curing is photocuring by means of actinic light, as disclosed above. However, other means of radiation curing, such as electron beam curing, and curing by means of gamma rays, may be used instead of actinic light if desired. The term "radiation curing" shall include curing by means of electron beam or gamma radiation, as well as by means of actinic light, but shall not include treatment with infrared radiation, since infrared radiation is not suitable for curing of photopolymer materials. When electron beam curing or curing by means of gamma radiation is used in place of actinic light, it is not necessary to use a photoinitiator; in all other respects, the content of the radiation curable composition is the same, whether curing is by means of actinic light or by other form of radiation.

EXAMPLES

This invention will now be described in further detail with reference to specific embodiments thereof.

Abbreviations used throughout the examples and elsewhere in the specification are given below under the heading "Abbreviations".

Physical testing procuedures, e.g. those used to test for oxygen permeability, modulus, tensile strength, elongation, etc., are described below under the heading, "Physical Testing Procedures".

Certain general methods were used to prepare, compound and cure end-capped prepolymers (i.e., photopolymers) in accordance with this invention. These methods are described below under the heading "Preparation Methods". Minor modifications of these methods were sometimes used in preparing the specific photopolymer formulations described in the examples.

ABBREVIATIONS

The following abbreviations are used throughout the examples and elsewhere in the specification to denote the materials indicated below.

PHOTOPOLYMER STARTING MATERIALS

HEMA = 2 = hydroxyethyl methacrylate
TDI = toluene diisocyanate, which is a commercial mixture of about 95–98% 2,4-toluene diisocyanate and about 2–5% 2,6-toluene diisocyanate.

REACTIVE MONOMERS

C-2000-See "Sartomer" C-2000.
2-EHA = 2-ethylhexyl acrylate
HEMA = 2-hydroxyethyl methacrylate
HPMA = hydroxypropyl methacrylate (obtainable from Rohm & Haas Co.)
IEM = 2-isocyanatoethyl methacrylate
NVP = N-vinyl-2-pyrrolidone, inhibited with 25 ppm of N,N'-di-sec.-butyl-p-phenylene-diamine; available from GAF Corp.
PPGMM = polypropylene glycol monomethacrylate (MW 350–387) inhibited with 300–500 ppm of p-methoxyphenol; available from Alcolac.
QM-672 = dicyclopentenyloxy ethyl acrylate; obtainable from Rohm & Haas Co.
"RC-20" = ethoxyethoxyethyl acrylate; available from Morton-Thiokol Corporation.
"Sartomer C-2000" = diacrylates of $C_{14}$ and $C_{15}$ diols (MW 450); available
"Sartomer C-9000" = P(butanediol) diacrylate (MW 850); available from Sartomer Company.
"Sartomer C-9001" = P(butanediol) diacrylate (MW 1150); available from Sartomer Company.

CHAIN TRANSFER AGENTS

DMP = dodecyl 3-mercaptopropionate
IPA = isopropyl alcohol (isopropanol)
TMPTMP = trimethylolpropane tri-(3-mercaptopropionate).

OTHER PHOTOPOLYMER COMPOUNDING MATERIALS

BP = benzophenone
"Irgacure-651 = 2,2-dimethoxy-2-phenyl-acetophenone; obtainable from Ciba-Geigy Corporation (photoinitiator)
TPP = triphenylphosphine (stabilizer).

ADHESION PROMOTING MATERIALS (Note: Reactive monomers used for promotion of adhesion are listed under "Reactive Monomers")
ATBN = ATBN 1300×16, which is an amine-terminated butadiene/acrylonitrile copolymer; obtainable from B. F. Goodrich Company, Chemical Division.
"Chemlok" 218 = an adhesive material, believed to be a 50 percent solution of a phenol-formaldehyde resole resin in methyl ethyl ketone; obtainable from Lord Corporation.
"Chemlok" 7701 = a 3 percent solution of a cyanuric acid derivative, believed to be trichloroisocyanuric acid (TCIA); obtainable from Lord Corporation. Used as a surface primer.
"EPON" 828 = an ephichlorohydrin-based epoxy resin; obtainable from Shell Oil Company.

TCIA=trichloroisocyanuric acid. (See "Chemlok"7701).

"Versamid" 140=a polyamide resin; obtainable from Henkel Corporation.

ADDITIVES (E.G. STABILIZERS FOR REGEANTS)

MEHQ=4-methoxyphenol (sometimes referred to as methoxyhydroquinone) (stabilizer).

QUANTITIES OTHER THAN MATERIALS

Chain ext.=chain extension ratio
meq=milliequivalents
PHR or phr=parts by weight per 100 parts of rubber or elastomer. Also used more broadly herein to denote parts by weight per 100 parts of addition polymerizable monomers (in uncured compositions)
Polyester MW=molecular weight of polyester diol (i.e. hydroxyl terminated polyesteralways polyethylene adipate in the examples).
PP=photopolymer
Reac mon=reactive monomer
RH=relative humidity.

PHYSICAL TESTING PROCEDURES

Brittle point (°C.). ASTM D-746, "Solenoid brittleness". Test samples are as follows: "Unsupported film" denotes an unsupported elastomer film 10 mils thick; "Composite" denotes a composite sheet of natural rubber/SBR blend 35 mils thick and elastomer film 10 mils thick, prepared by applying uncured photopolymer formulation to uncured rubber sheet which had been pretreated with TCIA (and optionally reactive monomers for surface activation) to improve adhesion of the elastomer film.

Permeability (oxygen permeability) (cc-mil/100 sq. in-day). ASTM D-3985. Measured at either 0% or 100% relative humidity and at atmospheric pressure.

Peel adhesion (pounds per linear inch, or pli). ASTM D-413. A strip one inch wide, with a pull tabl at one end, is cut from a flat composite rubber/elastomer film composite sheet. The sample is tested using an Instron tensile tester operating at a cross-head speed of 2 inches per minute. Tests are carried out at 75° F. and 160° F. according to Test 638. Any testing machine of constant rate of cross head movement can be used.

Tg (glass transition temperature) (°C.). The glass transition temperatures are taken as the inflection points on the loss modulus curves.

Tear (Crescent tear). ASTM D 624.

Tensile measurements (all lb./in$^2$) and elongation (%)-ASTM D-412. Tensile measurements include: tensile strength (measured at yield point), ultimate strength (measured at break), and modulus (measured at 100% and 200% elongation). Elongation is measured at break. Tests are carried out at 75° F. and 160° F.

Tension set (%) - ASTM D-412. Set measured (as a percentages of original length) at 1 min. and 10 min. after the specimen has been held for 10 min. at 100% strain.

PREPARATION METHODS

End capped prepolymers (i.e. photopolymers) photocurable compositions (i.e. photopolymer formulations) and elastomer films (i.e. cured photopolymers according to this invention may be prepared as follows:
A. Method A (Laboratory Scale)
1. Polyester diol A three-necked flask is charged with adipic acid and ethylene glycol in an ethylene glycol/adipic acid molar ratio of 1.23, and with 100 PPM of tin catalyst as dibutyl tin oxide. The flask is equipped with a fractionating column and a distillation head. In addition, a nitrogen sparge is maintained. The flask is heated to 195° C. and the water generated is collected to determine the extent (as percentage of theoretical) to which the reaction has occurred. When water evolution slows, the temperature is slowly raised until it reaches 250° C. over a period of 2-3 hours. The nitrogen sparge is reduced and a vacuum is applied such that pressure in the flask reaches 200 mm of Hg over a period of 35-45 minutes. The flask contents are allowed to cool and to return to atmospheric pressure. This yields hydroxyl terminated polyethylene adipate of about 800 mol wt.

The above procedure may be followed, using an ethylene glycol/adipic acid molar ratio of 1.15 instead of 1.23, to obtain hydroxyl terminated polyethylene adipate of about 1200 mol wt.

The molecular weight of the hydroxyl terminated polyethylene adipate (designated as "polyester mol. wt." in the examples) can be calculated from the hydroxyl number, which is the number of milligrams of KOH that reacts with one gram of hydroxyl terminated polyethylene adipate, (i.e., mg KOH/g polyester).

Any desired molecular weight of hydroxyl terminated polyethylene adipate, from 600 or lower to about 2000 can be obtained by appropriate variation of the ethylene glycol/adipic acid molar ratio. Alternatively, hydroxyl terminated polyethylene adipate having a molecular weight of either 800 or 1200 is commercially available from Witco Chemical Co. under the tradenames Formrez 135 (MW 800) and Formrez 93 (MW 1200).

2. Isocyanate Terminated Prepolymer

A hydroxyl terminated ethylene adipate, either purchased or prepared as in Step 1 of this example, may be reacted with TDI (toluene diisocyanate, which is a commercial mixture typically containing about 95-98 percent of 2,4-toluene diisocyanate and about 2-5 percent of 2,6-toluene diisocyanate) at various mole ratios which are stoichometric for the degree of chain extension desired. The TDI/hydroxyl terminated ethylene adipate (or polyester diol) molar ratio always exceeds 1:1, since an isocyanate-terminated prepolymer is desired. First, the polyester diol is dried under vacuum at 100° C. for at least 1 hour. The reaction vessel is then brought to atmospheric pressure with a nitrogen purge and cooled to approximately 60° C. The TDI is then added to the polyester diol with vigorous stirring. An exotherm results but this usually does not exceed 90°-100° C. After the exotherm subsides, the reaction mixture is maintained at 85°-95° C. for at least 1 hour. The NCO content is then determined by standard wet chemical techniques and the urethane molecular weight is calculated from these values assuming linearity. The chain extension ratio is calculated as: Chain Ext=MW(urethane)−MW(TDI)/MW(polyester diol)+MW(TDI)

$$\text{Chain Ext} = \frac{MW(\text{urethane}) - MW(TDI)}{MW(\text{polyester diol}) + MW(TDI)}$$

3. HEMA End Capped Prepolymer (Photopolymer)

The isocyanate terminated prepolymer prepared in step 2 is maintained in an inert atmosphere until ready for use. Then this prepolymer is heated to 60° C., and 0.5 phr (parts by weight per 100 parts of prepolymer) of p-methoxyphenol is added. To this mixture is added 105 percent of a theoretical quantity of 2-hydroxyethyl methacrylate (HEMA) with vigorous stirring. (The theoretical amount is based on NCO analysis of the reaction vessel contents). Addition is accomplished over a period of about 10 minutes. After the HEMA is added, the reaction product is discharged into containers, which are sealed and placed in an ice bath to cool. The resulting photopolymer (or end capped prepolymer) is a viscous liquid. The photopolymer molecular weight is calculated as:

Photopolymer MW = Urethane MW + 2(HEMA MW).

4. Photocured Composition (Photopolymer Formulation)

The photopolymer is dissolved in a reactive monomer or mixture thereof such as N-vinylpyrrolidone (NVP), in a brown bottle. Other ingredients, e.g. photoinitiators, stabilizers, and chain transfer agents, may be added to this mixture. Representative photoinitiators are: 2,2-dimethoxy-2-phenylacetophenone (obtainable as "Irgacure" 651 from Ciba Geigy of Ardsley, New York), and benzophenone. A representative stabilizer is triphenyl phosphine (TPP). A representative photoinitiator and stabilizer package, and the one actually used in the examples is as follows:

| Ingredient | Parts By Wt. |
|---|---|
| "Irgacure" 651 | 1.5 |
| Benzophenone | 1.5 |
| Triphenylphosphine (TPP) | 1.0 |

"Parts by weight" in the above listing refers to parts per 100 of addition polymerizable substances (photopolymer plus reactive monomers).

After addition of all ingredients, the mixture is rolled on a jar roller for about 2–4 hours so that dissolution is achieved. It is desirable to filter the solution through a Millipore pre-filter (AP) with 10–20 psig pressure when undissolved solids are observed.

NVP is used for purposes of illustration. Other reactive monomers and reactive monomer combinations were used in some of the examples herein.

5. Curing (Formation of Elastomer Film)

Unsupported elastomer films are prepared as follows:

The compounded solution from step 4 is poured on to a milled plate having a smooth "Teflon" or chromed surface and an 8–10 mil recess. The liquid is drawn down with a wire wound rod to a thickness which on curing will give a film of about 10±2 mils thick. The plate with solution thereon is placed on the conveyor belt of a Fusion Industries curing system, Model F450, equipped with an I233/K523 vertical irradiator/blower having 3 medium pressure mercury lamp bulbs in series, arranged linearly and transversely above the conveyor belt. The curing equipment also includes a screen (which serves as a radiation shield) between the lamps and the conveyor belt. The distance between the screen (i.e. the equipment in the examples herein) and the conveyor belt is usually either 2.1 inches, giving a radiation intensity of 0.7 joules/cm$^2$ per lamp or 3.6 inches, giving a radiation intensity of 0.5 joules/cm$^2$ per lamp per pass. Distances will be given in individual examples. The sample is passed under the lamps at a speed of 20 feet per minute sufficient times (at least 2 passes) to cure the photopolymer formulation. At least about 2.5 joules/cm$^2$ is required for cure. Much larger doses are possible without overcuring. (Photopolymer formulations were undercured in a few instances, as will be noted in individual examples). The radiation dosage level may be expressed either in joules/cm$^2$ or as the number of equivalent lamps. This number may be calculated by multiplying the number of passes by the number of lamps; thus, 10 passes with 3 lamps would be equivalent to exposure of 30 lamps. This procedure produces an unsupported (or free standing) cured elastomer film which is useful for physical testing.

Flat composite samples are prepared in the same way except that the viscous photopolymer formulation is coated onto a treated rubber surface of a flat substrate. (The surface is treated to improve adhesion of the elastomer film formed in this step). Film thicknesses and curing conditions are as described above.

B. Method B (Bench Scale)

1. Polyester diol

Hydroxyl terminated ethylene adipate having a molecular weight of either about 800 or about 1200 may be purchased from Witco Chemicals. Alternatively, this material or hydroxyl terminated polyethylene adipate having other desirable molecular weight may be made according to the procedure of Part A, step 1 except on a larger scale.

2. Urethane Prepolymer

Hydroxyl terminated polyethylene adipate in 5 gallon buckets is placed in an oven overnight at 180° F. to melt the polyethylene adipate. A reactor is then charged with about 50–65 pounds of this material and is heated to 210–220° F. When this temperature is reached, the reactor is evacuated and vacuum is maintained for 30 minutes to insure that the polyester diol is dry. The polyester diol is then discharged into 5 gallon buckets and placed in an oven at a temperature of at least 175° F.

A TDI charge is added to the reactor by means of a bomb so that the TDI is always in a closed container. The amount of TDI (about 1.2 moles per mole of polyethylene adipate) is calculated to give a chain extension value of 5. (There is often some variation between the target chain extension value and that measured). The chain extension actually obtained may be determined by ASTM Test No. D-1638. The reactor temperature was brought to 175°–185° F. with agitation. The polyester diol was then added incrementally, initial charges being in the 5–10 pound range. Larger increments can be added subsequently. The initial exotherm is the largest; subsequent exotherms are smaller. Each subsequent increment is not added until the reactor temperature returns to less than 185° F. After all of the polyester diol is added, the temperature is raised to 200° F. and maintained there for 1 hour. The viscosity increases as the reaction proceeds. After 1 hour the reactor is sampled and an NCO analysis run via the amine technique. A reactor temperature of 200° F. is maintained during analysis.

3. Photopolymer

The reactor temperature is lowered and 4-methoxyphenol (0.5 parts per 100 of urethane prepolymer) is added. After this material is mixed in, 2-hydroxyethyl methacrylate (HEMA) (105 percent of theoretical quantity based on NCO analysis) is added to the reactor via a bomb so that the HEMA is always handled in a closed system. The reaction is allowed to proceed for 10 minutes and the reaction product discharged into 1 gallon cans. The cans are refrigerated at 35° F.

The reactor is cleaned after each use by rinsing first with dimethylformamide (DMF) at 280°-290° F. followed by reflux with 1,1,2-trichloroethane.

4. Compounding

Photopolymer formulations (i.e. photocurable compositions) are prepared in a Ross LDM-2 double planetary mixer, manufactured by Charles Ross & Son Co., Haoppauge, N.Y. This mixer is a jacketed, temperature controlled variable speed (20-100 rpm) mixer with two planetary rectangular-shaped stirrers. The mixing action can be characterized by stretching, kneading and folding action without high shirring. Homogeneous blends are obtainable over a wide viscosity range of 1,000 to 500,000 cps. A masterbatch may be prepared when desired. For example, one may prepare a masterbatch of photopolymer, NVP and TPP (stabilizer), then add the remaining reactive monomers (if any), photoinitiators and any other ingredients to the masterbatch. The formulations will be given in the examples which follow.

5. Curing

The curing equipment and method of operation are the same as in Method A, step 5.

The examples which follow illustrate specific photopolymer formulations, low air permeability elastomer films and rubber/elastomer film composite articles prepared in accordance with the invention. In all cases the photopolymer was an end capped prepolymer prepared from hydroxyl terminated polyethylene adipate, TDI, and HEMA. All compositions are stated in PHR, i.e. parts by weight per 100 parts of addition polymerizable materials (photopolymer plus reactive monomers). All photopolymer formulations described in the examples contained 1.5 parts by weight each of "Irgacure" 651 and benzophenone (both photoinitiators) and 1.0 part by weight of triphenylphosphine (TPP) (a stabilizer), per 100 parts of addition polymerizable materials, in addition to the ingredients listed.

EXAMPLE 1

Two (2) photopolymers (or end capped prepolymers) were prepared from hydroxyl terminated ethylene adipate and TDI, and end capped with HEMA according to Method A. The first photopolymer (Photopolymer 1) had a polyester molecular weight of 800 and a chain extension ratio of 5.5. The second photopolymer had a polyester molecular weight of 1200 and a chain extension ratio of 5.0.

Three series of photopolymer formulations were prepared from the two photopolymers. Different reactive monomers, i.e. NVP, HEMA and HPMA, were used. Formulations were prepared both with and without a chain transfer agent, in this case isopropanol. These photopolymer were cured according to the procedures described above in preparation method A, to form unsupported films about 8 to 12 mils thick. Composites for brittleness testing were prepared as described in "Physical Testing Procedures." Compositions of these photopolymer formulations and physical properties of the films prepared therefrom are given in the tables, as follows: Tables I-A to I-C - First series - formulations prepared from Photopolymer 1; reactive monomer is NVP. Tables I-D to I-F - Second series - formulations prepared from Photopolymer 2; reactive monomer is NVP. Tables I-G, I-H and I-J - Third series - formulations prepared from Photopolymer 1; reactive monomer is either HEMA or HPMA.

TABLE I-A

| Sample | 1 | 2 | 3 | 4 | 5 |
|---|---|---|---|---|---|
| Composition | | | | | |
| Photopolymer | 75 | 75 | 75 | 75 | 75 |
| NVP | 25 | 20 | 15 | 20 | 15 |
| PPGMM | — | 5 | 10 | 5 | 10 |
| Isopropanol | — | — | — | 5 | 5 |
| Physical Properties | | | | | |
| Modulus, psi | | | | | |
| 100% | 690 | 440 | 270 | 390 | 250 |
| 200% | 1100 | 870 | 610 | 840 | 620 |
| Ult Elongation, % | 340 | 340 | 320 | 340 | 300 |
| Ult Tensile, psi | 3400 | 3170 | 2580 | 3260 | 2240 |
| Crescent Tear, ppi | 185 | 135 | 100 | 125 | 65 |
| Tensile Set, % | | | | | |
| 1 min | 32 | 21 | 16 | 25 | 15 |
| 10 min | 15 | 12 | 9 | 12 | 10 |
| Permeability, | | | | | |
| 0% R H | 33 | 48 | 65 | 65 | 67 |
| 100% R H | 60 | 77 | 95 | 100 | 96 |
| Brittle Point, C | | | | | |
| Unsupported film | −60 | −60 | −60 | −60 | −60 |
| Composite | −27 | −23 | −26 | −30 | −30 |
| Rheometrics | | | | | |
| Tg, C | 32 | 22 | 11 | | 7 |
| | −10 | −11 | −10 | | −15 |

TABLE I-B

| Sample | 1 | 2 | 3 | 4 |
|---|---|---|---|---|
| Formulation | | | | |
| Photopolymer | 70 | 70 | 70 | 70 |
| NVP | 30 | 25 | 20 | 20 |
| PPGMM | — | 5 | 10 | 10 |
| Isopropanol | — | — | — | 5 |
| Physical Properties | | | | |
| Modulus, psi | | | | |
| 100% | 1130 | 515 | 295 | 220 |
| 200% | 2850 | 1200 | 465 | 470 |
| Ult Elongation, % | 225 | 275 | 265 | 330 |
| Ult Tensile, psi | 3540 | 2600 | 1990 | 1880 |
| Crescent Tear, ppi | 210 | 145 | 90 | 85 |
| Tensile Set, % | | | | |
| 1 min | 52 | 29 | 19 | 17 |
| 10 min | 27 | 15 | 11 | 10 |
| Permeability, | | | | |
| 0% R H | 31 | 40 | 56 | 57 |
| 100% R H | 59 | 69 | 81 | 89 |

TABLE I-C

| Sample | 1 | 2 | 3 | 4 |
|---|---|---|---|---|
| Formulation | | | | |
| Photopolymer | 65 | 65 | 65 | 65 |
| NVP | 35 | 28 | 28 | 25 |
| PPGMM | — | 7 | 7 | 10 |
| Isopropanol | — | — | 3 | — |
| Physical Properties | | | | |
| Modulus, psi | | | | |
| 100% | 1820 | 770 | 340 | 600 |
| 200% | 2290 | 1350 | 690 | 900 |
| Ult Elongation, % | 410 | 315 | 320 | 450 |
| Ult Tensile, psi | 6100 | 2960 | 2500 | 4430 |
| Crescent Tear, ppi | 270 | 115 | 100 | 250 |
| Tensile Set, % | | | | |
| 1 min | 70 | 33 | 24 | 45 |
| 10 min | 55 | 17 | 12 | 20 |
| Permeability, | | | | |
| 0% R H | 40 | 42 | 43 | 52 |
| 100% R H | 74 | 73 | 79 | 82 |
| Rheometrics | | | | |
| Tg, C | | | 37 | 27 |

TABLE I-C-continued

| Sample | 1 | 2 | 3 | 4 |
|---|---|---|---|---|
| | | −10 | −15 | |

TABLE I-D

| Sample | 1 | 2 | 3 | 4 | 5 |
|---|---|---|---|---|---|
| Formulation | | | | | |
| Photopolymer | 75 | 75 | 75 | 75 | 75 |
| NVP | 25 | 20 | 15 | 20 | 15 |
| PPGMM | — | 5 | 10 | 5 | 10 |
| Isopropanol | — | — | — | 5 | 5 |
| Physical Properties | | | | | |
| Modulus, psi | | | | | |
| 100% | 280 | 200 | 160 | 150 | 130 |
| 200% | 480 | 360 | 340 | 260 | 220 |
| Ult Elongation, % | 370 | 370 | 310 | 430 | 380 |
| Ult Tensile, psi | 2700 | 2100 | 1430 | 2270 | 1400 |
| Crescent Tear, ppi | 130 | 100 | 100 | 100 | 80 |
| Tensile Set, % | | | | | |
| 1 min | 38 | 33 | 21 | 24 | 16 |
| 10 min | 21 | 18 | 12 | 12 | 9 |
| Permeability, | | | | | |
| 0% R H | 63 | 93 | 134 | 145 | 155 |
| 100% R H | 134 | 155 | 196 | 210 | 230 |
| Brittle Point, C | | | | | |
| Unsupported film | −60 | −60 | −60 | −60 | −60 |
| Composite | −34 | −32 | −31 | −35 | −46 |
| Rheometrics | | | | | |
| Tg, C | 22 | 11 | 6 | 2 | −5 |
| | −20 | −21 | −20 | −26 | −26 |

TABLE I-E

| Sample | 1 | 2 | 3 | 4 | 5 |
|---|---|---|---|---|---|
| Formulation | | | | | |
| Photopolymer | 70 | 70 | 70 | 70 | 70 |
| NVP | 30 | 25 | 20 | 25 | 20 |
| PPGMM | — | 5 | 10 | 5 | 10 |
| Isopropanol | — | — | — | 5 | 5 |
| Physical Properties | | | | | |
| Modulus, psi | | | | | |
| 100% | 880 | 550 | 350 | 510 | 190 |
| 200% | 1380 | 980 | 630 | 840 | 310 |
| Ult. Elongation, % | 380 | 400 | 380 | 400 | 450 |
| Ult. Tensile, psi | 4120 | 3500 | 2660 | 3500 | 2420 |
| Crescent Tear, ppi | 280 | 180 | 120 | 150 | 90 |
| Tensile Set, % | | | | | |
| 1 min | 40 | 30 | 25 | 29 | 21 |
| 10 min | 22 | 16 | 15 | 16 | 14 |
| Permeability, | | | | | |
| 0% R H | 58 | 74 | 102 | 96 | 99 |
| 100% R H | 124 | 140 | 170 | 180 | 186 |
| Rheometrics | | | | | |
| Tg, C | 33 | 27 | 17 | 12 | 2 |
| | −20 | −20 | −21 | −26 | −25 |

TABLE I-F

| Sample | 1 | 2 | 3 | 4 | 5 |
|---|---|---|---|---|---|
| Formulation | | | | | |
| Photopolymer | 65 | 65 | 65 | 65 | 65 |
| NVP | 35 | 30 | 25 | 30 | 25 |
| PPGMM | — | 5 | 10 | 5 | 10 |
| Isopropanol | — | — | — | 5 | 5 |
| Physical Properties | | | | | |
| Modulus, psi | | | | | |
| 100% | 470 | 320 | 330 | 360 | 220 |
| 200% | 670 | 480 | 550 | 570 | 350 |
| Ult. Elongation, % | 360 | 420 | 470 | 470 | 490 |
| Ult. Tensile, psi | 2520 | 2900 | 3390 | 3640 | 2890 |
| Crescent Tear, ppi | 120 | 120 | 100 | 90 | 80 |
| Tensile Set, % | | | | | |
| 1 min | 44 | 35 | 26 | 30 | 28 |
| 10 min | 26 | 19 | 14 | 17 | 12 |

TABLE I-F-continued

| Sample | 1 | 2 | 3 | 4 | 5 |
|---|---|---|---|---|---|
| Permeability, | | | | | |
| 0% R H | 57 | 78 | 116 | 151 | 156 |
| 100% R H | 126 | 148 | 174 | 210 | 210 |
| Rheometrics | | | | | |
| Tg, C | 37 | 32 | 17 | 7 | 12 |
| | −20 | −21 | −26 | −31 | −25 |

TABLE I-G

| Sample | 1 | 2 | 3 | 4 | 5 |
|---|---|---|---|---|---|
| Formulation | | | | | |
| Photopolymer | 75 | 75 | 75 | 75 | 75 |
| HEMA | 25 | 20 | 20 | 15 | 15 |
| PPGMM | — | 5 | 5 | 10 | 10 |
| Isopropanol | — | — | 5 | — | 5 |
| Physical Properties | | | | | |
| Modulus, psi | | | | | |
| 100% | 1120 | 660 | 460 | 410 | 260 |
| 200% | 1770 | 1140 | 820 | 780 | 440 |
| Ult. Elongation, % | 310 | 320 | 340 | 320 | 380 |
| Ult. Tensile, psi | 3280 | 2600 | 2120 | 2220 | 1810 |
| Crescent Tear, ppi | 270 | 180 | 180 | 160 | 110 |
| Tensile Set, % | | | | | |
| 1 min | 32 | 28 | 28 | 23 | 23 |
| 10 min | 20 | 17 | 17 | 14 | 13 |
| Permeability, | | | | | |
| 0% R H | 37 | 48 | 51 | 53 | 56 |
| 100% R H | 63 | 70 | 73 | 77 | 80 |
| Brittle Point, C | | | | | |
| Composite | — | −42 | −38 | −47 | −46 |
| Rheometrics | | | | | |
| Tg, C | 1 | 2 | 1 | −5 | −5 |

TABLE I-H

| Sample | 1 | 2 | 3 | 4 | 5 |
|---|---|---|---|---|---|
| Formulation | | | | | |
| Photopolymer | 75 | 75 | 75 | 75 | 75 |
| HPMA | 25 | 20 | 15 | 20 | 15 |
| PPGMM | — | 5 | 5 | 10 | 10 |
| Isopropanol | — | — | 5 | — | 5 |
| Physical Properties | | | | | |
| Modulus, psi | | | | | |
| 100% | 1000 | 600 | 510 | 330 | 250 |
| 200% | 1640 | 1080 | 890 | 650 | 475 |
| Ult Elongation, % | 330 | 330 | 365 | 335 | 355 |
| Ult Tensile, psi | 3970 | 3180 | 2890 | 2240 | 2030 |
| Crescent Tear, ppi | 260 | 180 | 175 | 120 | 105 |
| Tensile Set, % | | | | | |
| 1 min | 31 | 23 | 23 | 19 | 19 |
| 10 min | 18 | 14 | 15 | 12 | 12 |
| Permeability, | | | | | |
| 0% R H | 46 | 54 | 63 | 74 | 68 |
| 100% R H | 68 | 78 | 90 | 101 | 97 |
| Brittle Point, C | | | | | |
| Composite | −52 | −51 | −51 | −50 | −53 |
| Rheometrics | | | | | |
| Tg, C | 1 | 2 | 1 | 1 | −5 |

TABLE I-J

| Sample | 1 | 2 | 3 | 4 | 5 |
|---|---|---|---|---|---|
| Formulation | | | | | |
| Photopolymer | 65 | 65 | 65 | 65 | 65 |
| HEMA | 35 | 30 | 20 | 30 | 28 |
| PPGMM | — | 5 | 10 | 5 | 7 |
| Isopropanol | — | — | — | 5 | 3 |
| Physical Properties | | | | | |
| Modulus, psi | | | | | |
| 100% | 1770 | 1320 | 650 | 960 | 830 |
| 200% | 2820 | 2180 | 1190 | 1640 | 1360 |
| Ult Elongation, % | 270 | 235 | 310 | 290 | 300 |

TABLE I-J-continued

| Sample | 1 | 2 | 3 | 4 | 5 |
|---|---|---|---|---|---|
| Ult Tensile, psi | 4220 | 3540 | 2820 | 2950 | 2650 |
| Crescent Tear, ppi | 350 | 280 | 120 | 230 | 220 |
| Tensile Set, % | | | | | |
| 1 min | 56 | 45 | 34 | 38 | 41 |
| 10 min | 38 | 28 | 18 | 23 | 26 |
| Permeability, | | | | | |
| 0% | 31 | 39 | 55 | 40 | 44 |
| 100% | 59 | 68 | 89 | 67 | 75 |

EXAMPLE 2

This example shows the effect of various chain transfer agents on the physical properties of elastomer films obtained therefrom.

Photopolymer formulations having the compositions shown in TABLE II were prepared. Each such formulation was cast and cured by exposure to 30 lamps to form unsupported films. Tensile tests on these films showed the properties given in TABLE II below. Formulations 1 and 2, which contained carbon tetrabromide as chain transfer agent, were not tested because they gelled.

TABLE II

| Sample | 1 | 2 | 3 | 4 | 5 | 6 | 7 | 8 | 9 |
|---|---|---|---|---|---|---|---|---|---|
| Composition | | | | | | | | | |
| Photopolymer | 70 | 70 | 70 | 70 | 70 | 70 | 70 | 70 | 70 |
| NVP | 30 | 30 | 30 | 30 | 30 | 30 | 30 | 30 | 30 |
| Carbon Tetrabromide | 0.5 | 1.0 | | | | | | | |
| Isopropanol | | | 1.0 | 2.0 | | | | | |
| DMP | | | | | 0.5 | 3.0 | | | |
| TMPTMP | | | | | | | 0.5 | 3.0 | |
| Chain Transfer Agent, meq | 6 | 12 | 17 | 34 | 2 | 4 | 4 | 8 | |
| Modulus, psi | | | | | | | | | |
| 100% | | | 1220 | 640 | 1030 | 520 | 1150 | 580 | 1290 |
| 200% | | | 2710 | 1650 | 1570 | 670 | | 770 | 2700 |
| Elong, % | | | 230 | 230 | 300 | 440 | 220 | 350 | 240 |
| Tensile, psi | | | 3420 | 2290 | 3390 | 2170 | 2460 | 1790 | 3760 |
| Tension Set (100%), % | | | | | | | | | |
| 1 min | | | 52 | 33 | 60 | 53 | 51 | 51 | 64 |
| 10 min | | | 20 | 9 | 24 | 23 | 21 | 19 | 28 |

EXAMPLE 3

This example shows the effect of various secondary alcohols, including 2-propanol (isopropanol, isopropyl alcohol) as chain transfer agents.

Formulations having the compositions shown in TABLE III below were prepared, cast and cured to form unsupported elastomer films. Equimolar quantities of all secondary alcohol tests were used. Physical test results are shown in TABLE III. All films tested had satisfactory physical properties.

TABLE III

| Sample | 1 | 2 | 3 | 4 | 5 |
|---|---|---|---|---|---|
| Formulation | | | | | |
| Photopolymer | 70 | 70 | 70 | 70 | 70 |
| NVP | 20 | 20 | 20 | 20 | 20 |
| PPGMM | 10 | 10 | 10 | 10 | 10 |
| 2-Butanol, phr | 6.2 | — | — | — | — |
| 2-Pentanol, phr | — | 7.4 | — | — | — |
| 4-Methyl-2-pentanol, phr | — | — | 8.4 | — | — |
| 2,6-Dimethyl 4-heptanol, phr | — | — | — | 11.9 | — |
| 2-Propanol, phr | — | — | — | — | 5.0 |
| Physical Properties | | | | | |
| Modulus, psi | | | | | |
| 100% | 220 | 220 | 190 | 260 | 160 |
| 200% | 320 | 300 | 260 | 320 | 200 |
| Ult Elong, % | 490 | 510 | 500 | 540 | 560 |
| Ult Tens, psi | 1770 | 1940 | 1570 | 2150 | 1430 |
| Cresc Tear, ppi | 105 | 130 | 90 | 100 | — |
| Tensile Set, % | | | | | |
| 1 min | 29 | 30 | 30 | 43 | 26 |
| 10 min | 12 | 13 | 19 | 22 | 16 |
| Permeability, | | | | | |
| 0 R H % | 38 | 48 | 47 | 60 | 48 |
| 100 R H % | 68 | 83 | 80 | 107 | 87 |

EXAMPLE 4

This example illustrates the effect of various amounts of isopropanol chain transfer agent on heat aged elastomer films.

The photopolymer used in this example had a polyester molecular weight of 800 and a chain extension ratio of 5.5.

Photopolymer formulations having the compositions listed in TABLE IV below were prepared, formed into unsupported films and cured. The cured unsupported elastomer films were heat aged for either 10 or 20 days at 100° C. Physical properties were determined before and after heat aging. Results are shown in TABLE IV.

TABLE IV

| Sample | 1 | 2 | 3 | 4 |
|---|---|---|---|---|
| Formulation | | | | |
| Photopolymer | 70 | 70 | 70 | 70 |
| NVP | 30 | 30 | 30 | 30 |
| Isopropanol | 0 | 2.5 | 5.0 | 10.0 |
| Original Properties | | | | |
| 100% Modulus, psi | 1220 | 810 | 390 | 110 |
| Elongation, % | 250 | 250 | 260 | 290 |
| Tensile, psi | 3450 | 2530 | 2060 | 850 |
| Crescent Tear, ppi | 345 | 222 | 124 | 81 |
| Tension Set (100%), % | | | | |
| 1 min | 48 | 37 | 26 | 0 |
| 10 min | 19 | 11 | 7 | 0 |
| Heat Aged - 10 Days at 100 C | | | | |
| 100% Modulus, psi | 1400 | 1240 | 1270 | 1090 |
| Elongation, % | 160 | 180 | 170 | 160 |
| Tensile, psi | 2010 | 2000 | 1810 | 1400 |

TABLE IV-continued

| Sample | 1 | 2 | 3 | 4 |
|---|---|---|---|---|
| Heat Aged - 20 Days at 100 C | | | | |
| 100% Modulus, psi | 1610 | 1460 | 1430 | 1090 |
| Elongation, % | 150 | 170 | 140 | 170 |
| Tensile, psi | 2000 | 1920 | 1770 | 1520 |

EXAMPLE 5

This example illustrates the effect of polyester molecular weight and chain extension ratio of the photopolymer on the properties of elastomer films prepared therefrom.

Nine photopolymer samples, having three different polyester molecular weights and different chain extension ratios, were prepared. The compositions of these samples are shown in TABLE V-A below.

Each of the samples listed in TABLE V-A was compounded with NVP (60 parts of photopolymer and 40 parts of NVP) plus the usual photoinitiators and stabilizer (given before in Example 1), cast on a stainless steel plate and cured by exposure to 45 UV lights, all as described in Method A of "Photopolymer Preparation and Compounding". The cured unsupported elastomer films thus formed had the physical properties given in TABLE V-B below.

Samples 1-4 had good oxygen permeability but low elongation. Samples 5 and 7-9 had good elongation, but oxygen permeability was too high. Only sample 6 had both satisfactory oxygen permeability and satisfactory elongation. Even sample 6 does not represent an optimum composition (the chain extension ratio is below optimum) as will be evident from other examples herein.

TABLE V-A

PHOTOPOLYMER COMPOSITIONS

| | Polyester | | Urethane | | |
|---|---|---|---|---|---|
| Sample | OH No | M W | M W Obs | Chain Ext | Photopolymer M W |
| 1 | 181 | 620 | 1070 | 1.1 | 1330 |
| 2 | 181 | 620 | 2090 | 2.4 | 2350 |
| 3 | 191 | 620 | 2600 | 3.0 | 2830 |
| 4 | 95 | 1180 | 1380 | 0.9 | 1640 |
| 5 | 95 | 1180 | 2950 | 2.0 | 3210 |
| 6 | 95 | 1180 | 3510 | 2.5 | 3770 |
| 7 | 57 | 1960 | 2790 | 1.2 | 3050 |
| 8 | 57 | 1960 | 4920 | 2.2 | 5180 |
| 9 | 57 | 1960 | 7620 | 3.5 | 7880 |

TABLE V-B

PHYSICAL PROPERTIES

| | | Modulus | | Permeability | |
|---|---|---|---|---|---|
| Sample | Tensile psi | 100% psi | Elongation % | 0% RH | 100% RH |
| 1 | 9400 | — | 5 | 12 | 25 |
| 2 | 8100 | — | 3 | 10 | 29 |
| 3 | 7900 | — | 5 | 10 | 27 |
| 4 | 5100 | — | 50 | 45 | 90 |
| 5 | 4650 | 2980 | 165 | 105 | 160 |
| 6 | 4260 | 2180 | 210 | 54 | 66 |
| 7 | 3460 | 2120 | 170 | 61 | 84 |
| 8 | 3130 | 870 | 390 | 94 | 107 |
| 9 | 3160 | 530 | 605 | 84 | 200 |

EXAMPLE 6

This example further illustrates the effect of polyester molecular weight and chain extension ratio of the photopolymer on the physical properties of elastomer films prepared therefrom. Polyester molecular weights in this example represent preferred values; however, chain extension ratios, except in sample 3, were below optimum.

Four photopolymer samples, having the compositions shown in TABLE VI-A below, were prepared. Each of these samples was compounded with NVP) and the usual photoinitiators and stabilizer, cast on a stainless steel plate and cured by exposure to 30 UV lights, all as described in Method B of "Photopolymer Preparation and Compounding". The cured unsupported elastomer films thus formed had the physical properties given in TABLE VI-B below.

All film samples had satisfactory physical properties. The overall physical properties of samples 2 and 3 are better than than those of samples 1 and 4. Elongation is low in sample 1. Sample 4 had poorer tensile properties than sample 3, and oxygen permeability of both samples was about the same.

TABLE VI-A

| | Polyester | | Urethane | | |
|---|---|---|---|---|---|
| Sample | OH No | M W | M W Obs | Chain Ext | Photopolymer M W |
| 1 | 142 | 790 | 2530 | 2.7 | 2790 |
| 2 | 142 | 790 | 3600 | 3.8 | 3860 |
| 3 | 118 | 950 | 6500 | 5.6 | 6760 |
| 4 | 92 | 1220 | 3840 | 2.6 | 4100 |

TABLE VI-B

| | | Modulus | | Permeability | |
|---|---|---|---|---|---|
| Sample | Tensile psi | 100% psi | Elongation % | 0% RH | 100% RH |
| 1 | 4000 | 3100 | 128 | 22 | 55 |
| 2 | 3440 | 1960 | 160 | 27 | 68 |
| 3 | 4660 | 1764 | 306 | 48 | 112 |
| 4 | 3070 | 1430 | 265 | 50 | 109 |

EXAMPLE 7

An approach to shorten and simplify the process of obtaining a fully cured innerliner is to apply the photopolymer to the green tire and only partially cure the photopolymer by UV light. Photopolymer cure may then be completed in the tire mold while the rest of the tire is being thermally cured. To accomplish this objective, thermal initiators, which are not consumed during UV curing, must be incorporated in the photopolymer formulation. This example illustrates the effect of various amounts of thermal initiator and various UV and thermal cure times on the physical properties of an unsupported elastomer film. The thermal initiator was 2.5-dimethyl-2,5-di(t-butylperoxyhexane) and is referred to simply as "peroxide" in the tables accompanying this example.

A photopolymer formulation having the composition given in TABLE VII-A below was prepared. The photopolymer had a polyester molecular weight of 800 and a chain extension ratio of 5.5.

TABLE VII-A

| Compositions (wt. parts) | |
|---|---|
| Photopolymer | 65 |
| NVP | 28 |
| PPGMM | 7 |
| Peroxide | As shown in TABLE VII-B |

The photopolymer formulation was cast into an unsupported film according to Method A. The unsupported film was UV cured, then thermally cured. UV cure was carried out as described in Method A, step 5, with the photopolymer coating layer as the top layer. Radiation dosage is given in number of lights; each light represents a radiation dosage of 0.7 joules/cm$^2$. Thermal curing was carried out at 300° F. and 100 psi for 20 minutes. The photopolymer layer was partially cured during UV exposure, and curing was completed during thermal cure.

The cured films were subjected to physical tests. Results are shown in TABLE VII-B below.

Formulation". Variations in the isopropanol content of the photopolymer formulation are shown in TABLE VIII-B under the heading, "Effect of Isopropyl Alcohol".

The photopolymer formulation was applied to the UV-activated surface immediately after activation. This was accomplished by spreading the viscous formulation with a wire wound rod. Thickness 10 mils is controlled by applying masking tape to the edges. The samples were allowed to set at least 3 minutes before proceeding.

The photopolymer-coated samples were exposed to UV radiation according to the procedure in "Photo-

TABLE VII-B

DUAL UV-THERMAL CURING OF PHOTOPOLYMERS
2,5-DIMETHYL-2,5-DI(t-BUTYLPEROXY)HEXANE

| | Sample | | | | | | | |
|---|---|---|---|---|---|---|---|---|
| | 1 | 2 | 3 | 4 | 5 | 6 | 7 | 8 |
| Composition and Curing | | | | | | | | |
| Peroxide, phr | 0.5 | 0.5 | 1.0 | 1.0 | 0.5 | 0.5 | 0.5 | 0.5 |
| UV Cure, lights | 9 | 9 | 9 | 9 | 9 | 30 | 30 | 30 |
| Thermal Cure, min at 300 F. | 15 | 30 | 15 | 30 | 0 | 0 | 15 | 30 |
| Physical Properties | | | | | | | | |
| Modulus, psi | | | | | | | | |
| 100% | 600 | 730 | 670 | 650 | 300 | 600 | 720 | 690 |
| 200% | 900 | 1030 | 1060 | 960 | 520 | 950 | 1060 | |
| Elongation, % | 360 | 320 | 330 | 280 | 405 | 380 | 250 | 180 |
| Tensile, psi | 2290 | 1900 | 2360 | 1540 | 2510 | 3120 | 1370 | 938 |
| Crescent Tear, ppi | 160 | 210 | 170 | 160 | 140 | 230 | 180 | 200 |
| Tensile Set, % (100% Stress) | | | | | | | | |
| 1 min | 62 | 68 | 65 | 66 | 48 | 66 | 82 | 88 |
| 10 min | 25 | 32 | 25 | 29 | 21 | 28 | 47 | 48 |
| Oxygen Permeability | | | | | | | | |
| 0% RH | 70 | | 62 | 61 | | 53 | | |
| 100% RH | 115 | | 107 | 123 | | 109 | | |

EXAMPLE 8

This example describes the preparation of flat rubber-/elastomer film composites by a process in which a photopolymer formulation is applied to a flat substrate which includes a green rubber layer having a peroxide cure system.

The rubber substrate had a sandwich structure of green NR-SBR/fabric/NR-SBR/-NR with a peroxide cure system, with the green natural rubber (NA) layer being the surface for activation and coating. This material, when thermally cured under conventional conditions, had the physical properties indicated in TABLE VIII-A under the heading "Rubber Properties".

The composition given under the heading, "Reactive Monomers for Surface Treatment" in TABLE VIII-A was applied to the compounded rubber surface with a "Kimwipe" cloth with rubbing. The rubber substrate was allowed to sit for 10 minutes to permit the reactive monomer mixture to soak.

Samples were exposed to UV lights at various dosages, which are given in TABLE VIII-B under the heading, "Effect of UV Exposure". This activated the reactive monomer-treated surfaces. The apparatus and the converyor belt speed were the same as those described under the heading, "Photopolymer Preparation, Compounding and Curing", method A or B, step 5.

The polymer used throughout this example had a polyester molecular weight of 800 and a chain extension ratio of 5.

The photopolymer was compounded as shown in TABLE VIII-A under the heading, "Photopolymer Formulation, Casting and Curing", step 5. The distance from the equipment to the conveyor belt was 2.6 inches. Dosage levels are shown in TABLE VIII-B. Dosage levels are expressed in number of equivalent lights. TABLE VIII-B also indicates the equivalency between number of equivalent lights and radiation intensity in joules/cm$^2$ for each group of runs. The radiation levels were sufficient to at least set the photopolymer formulations. In most cases the photopolymer formulations are cured.

After UV exposure, the samples were allowed to set for at least one hour. They were then termally cured at 340° F. (171° C.) for 15 minutes at 100 psig in a press using a bladder mold.

Results in TABLE VIII-B show the following:

(1) The presence of isopropanol in the photopolymer formulation adversely affects adhesion. Decrease in adhesion at 1 phr was acceptable; at 3 phr, the decrease was unacceptable. (Data elsewhere in this application show that isopropanol improves modulus).

(2) The level of UV exposure during substrate surface preparation has a marked effect on adhesion. This level can be either too low (sample 1), too high (sample 4), or within desired range (samples 2 and 3).

(3) A photoinitiator in the reactive monomer mixture used for surface preparation is essential.

Control samples were prepared as described above, except that application of reactive monomers and their exposure to UV radiation (the surface preparation steps) were omitted. Where these control samples were removed from the thermal curing press, the cured photopolymer delaminated from the rubber.

TABLE VIII-A

| Rubber Properties | |
|---|---|
| Tensile | 3200 psi |
| 300% Modulus | 1580 psi |
| Elongation | 480% |
| Shore A Hardness | 57 |
| Rheometer (340 F.) | |
| T'C25 | 3.0 min |
| T'C90 | 15.5 min |
| Reactive Monomers for Surface Treatment | |
| 2-ethylhexylacrylate | 33.3 wt % |
| QM-672 (Rohm & Haas) | 33.3 wt % |
| C-2000 (Sartomer) | 33.3 wt % |
| Irgacure 651 (Ciba-Geigy) | 5.0 phr |
| Photopolymer Formulation | |
| Photopolymer | 65.0 wt % |
| N-vinyl pyrrolidone (GAF) | 28.0 wt % |
| PPGMM (Alcolac) | 7.0 wt % |
| OPTIONAL | |
| Isopropyl Alcohol, phr | 0.0 to 3.0 |

TABLE VIII-B

| | Effect of Isopropanol Alcohol (IPA) | | | |
|---|---|---|---|---|
| | IPA | Exposure, lights | | Adhesion, ppi |
| Sample | phr | Reac Mon | PP | RT | 160 F. |
| 1 | 0 | 24 | 15 | 22 | 8 |
| 2 | 1 | 24 | 15 | 14 | 6 |
| 3 | 3 | 24 | 15 | 13 | 2 |
| | Effect of UV Exposure | | | |
| | IPA | Exposure, lights | | Adhesion, ppi |
| Sample | phr | Reac Mon | PP | RT | 160 F. |
| 4 | 0 | 15 | 15 | 14 | — |
| 5 | 0 | 21 | 15 | 14 | 8 |
| 6 | 0 | 24 | 15 | 16 | 10 |
| 7 | 0 | 30 | 15 | 11 | 2 |
| | Effect of Photoinitiator Concentration | | | |
| | I651 | Exposure, lights | | Adhesion, ppi |
| Sample | phr | Reac Mon | PP | RT | 160 F. |
| 8 | 0 | 24 | 15 | 9 | 2 |
| 9 | 1 | 24 | 15 | 20 | 4 |
| 10 | 3 | 24 | 15 | 22 | 6 |
| 11 | 5 | 24 | 15 | 22 | 6 |

Note: Photopolymer film tore in all tests.

EXAMPLE 9

This example further describes preparation of flat rubber/elastomer film composites by a process in which a photocurable composition (or photopolymer formulation) is applied to a flat green rubber substrate having a sulfur cure system.

The photopolymer used in this example had a polyester molecular weight of 810 and a chain extension ratio of 5.5. The composition of the photopolymer formulation is given in TABLE IX-A below.

Flat composite reinforced rubber samples were prepared for laboratory testing by laminating the following: (1) a rubber layer (natural rubber/SBR compounded with sulfur curatives) 0.035 inch thick (2) a scrim stock consisting of an open weave fabric, and (3) a second rubber layer, also natural rubber/SBR compounded with sulfur curatives, 0.035 inch thick.

Test reinforced samples are wiped with "Chemlok" 7701 (3 percent TCIA in ethyl acetate) and air dried at room temperature for 3-15 minutes. Samples are then irradiated at various dosage levels as described in preparation method B, step 5. Dosage levels of about 25 joules/cm$^2$ or higher are shown to give good green rubber adhesion and blister-free cured product in which the air barrier elastomer adheres well to the substrate. Results are shown in TABLES IX-B and IX-C.

The samples are coated with a 0.020 inch layer of photopolymer formulation. The coated composite samples are UV cured as described in "Preparation Methods" method B, step 5 for 7 passes (equivalent to 21 light exposures, or 14.7 joules/cm$^2$ radiation dose).

Finally, the samples are placed in a bladder press to thermally cure the rubber ply construction. Operating conditions are: platen temperature, 340° F.; air pressure to the bladder, 120 psig; and length of time, 14 minutes. The samples are positioned against the rubber bladders so as to simulate actual production conditions. Both before and after thermal molding, observations are made as to green adhesion and the formation of blisters.

One inch wide samples are prepared for adhesion testing and tested at 160° F. Results are shown in TABLES IX-B and IX-C below.

Certain samples are allowed to age for 2 to 14 days after irradiation of the substrate and before coating with photopolymer formulation and curing. This practice appears not to be detrimental to adhesion. In this table "Time Days" represents the time from irradiation of the substrate until coating thereof. "Cont" denotes no delay between substrate irradiation and coating.

The effect of air aging of samples at room temperature was also studied. In a first series, the composite samples of rubber/fabric/rubber are suspended in laboratory air at room temperature for periods of either 7, 14, 21 or 28 days, and then removed and primed with "Chemlok" 7701, UV exposed, coated with a photopolymer formulation, UV cured and thermally cured as described above. The second series of samples are primed with "Chemlok" 7701, UV exposed for 12 equivalent lights (8.4 joules/cm$^2$) and are then air aged at room temperature for either 2, 7 or 14 days prior to application and curing of the photopolymer formulation. For comparison purposes, this series of tests also includes a sample which was coated with photopolymer formulation and then UV cured and thermally cured promptly after priming and UV treatment without application of a photocurable composition. The effects of these two aging modes on green rubber adhesion, cured rubber adhesion, and peel adhesion at 75° and 160° F. are shown in TABLES IX-D and IX-E, respectively. No significant effect on adhesion properties was observed as a result of either mode of air aging.

Finally, control rubber laminate samples (rubber/fabric/rubber are brushed with ethyl acetate alone instead of being primed with a solution of TCIA in ethyl acetate. These examples were further processed in the same manner as the test samples. After thermal curing, the elastomer film completely delaminated from the rubber composite substrate. The samples were not suitable for testing.

TABLE IX-A

| COMPOSITION (Wt Parts) | |
|---|---|
| Photopolymer | 65.0 |
| NVP | 26.5 |
| PPGMM | 7.0 |
| IEM | 1.5 |
| Isopropanol | 1.0 |

TABLE IX-B

UV PRIMER EXPOSURE STUDY FOCUSED FUSION LAMPS

| Sample | TCIA No of UV Lights | UV Dose Irrad Joul/cm² | Green Rubber Adhesion | Cured Rubber Results | Peel Adhesion 75 F. ppi | 160 F. ppi |
| --- | --- | --- | --- | --- | --- | --- |
| 5 | 1 | 0.7 | None | Blisters | — | — |
| 6 | 2 | 1.4 | Some | Blisters | — | — |
| 7 | 3 | 2.1 | Some | Sm Blist | 12.5 | 2.5 |
| 8 | 6 | 4.2 | Good | Good | 16.7 | 3.7 |
| 9 | 9 | 6.3 | Good | Good | 15.5 | 3.2 |
| 10 | 12 | 8.4 | Good | Good | 14.4 | 2.5 |

TABLE IX-C

| Sample | TCIA No of UV Lights | UV Dose Irrad Joul/cm² | Green Rubber Adhesion | Cured Rubber Results | Peel Adhesion 75 F. ppi | 160 F. ppi |
| --- | --- | --- | --- | --- | --- | --- |
| 11 | 1 | 0.5 | None | Blisters | — | — |
| 12 | 2 | 1.0 | None | Blisters | — | — |
| 13 | 3 | 1.4 | Some | Blisters | — | — |
| 14 | 6 | 2.9 | Good | Good | 16.0 | 3.7 |
| 15 | 12 | 5.8 | Good | Good | 22.8 | 4.7 |
| 16 | 18 | 8.6 | Good | Good | 23.0 | 4.3 |

TABLE IX-D

| Sample | Time Days | Green Rubber Adhes | Cured Rubber Results | Peel Adhesion 75 F. ppi | 160 F. ppi |
| --- | --- | --- | --- | --- | --- |
| 1 | Cont | Good | Good | 17.0 | 4.4 |
| 2 | 2 | Good | Good | 17.5 | 3.0 |
| 3 | 7 | Good | Good | 16.7 | 3.6 |
| 4 | 14 | Good | Good | 19.8 | 2.3 |

TABLE IX-E

| Sample | Time Days | Green Rubber Adhes | Cured Rubber Results | Peel Adhesion 75 F. ppi | 160 F. ppi |
| --- | --- | --- | --- | --- | --- |
| 21 | 7 | Good | Good | 17.3 | 2.6 |
| 22 | 14 | Good | Good | 19.2 | 2.5 |
| 23 | 21 | Good | Good | 19.3 | 2.9 |
| 24 | 28 | Good | Good | 18.0 | 2.8 |

EXAMPLE 10

This example describes a preferred method for applying a photocurable composition of this invention to a cured convenience spare and curing the photocurable composition.

Twenty-eight (28) tires, T-125/70D14 bias ply convenience spares were built according to standard production techniques except that the standard bromobutyl liner was replaced with NR/SBR truck tire inner liner (NR refers to natural rubber). The tires were cured using standard conditions, substituting a smooth tire cure bladder for the usual radial ribbed bladder. Representative physical properties of the bromobutyl innerliner, the NR/SBR innerliner, and the carcass in these tires is given in TABLE X.

The inner surfaces of the cured tires were cleaned with a 50/50 detergent concentrate/water solution using a steel wire brush. A water rinse was followed by a hexane wipe in order to remove as much as possible the bladder release agent. The inner surface was then treated with an epoxy based adhesive having the following composition:

| | Parts by wt. |
| --- | --- |
| "Chemlok" 218 | 30 |
| "Epon" 828 | 12 |
| "Versamide" 140 | 18 |
| Methyl ethyl ketone | 60 |

The photopolymer formulations used in this example had the compositions shown in TABLE X-A below and were prepared according to Method B. The photopolymer used in preparing both formulations had a polyester molecular weight of 750 and a chain extension ratio of 6.3.

Portions of the photopolymer formulations were formed into unsupported elastomer films. Physical properties of these films are given in TABLE X-B.

The photopolymers were compounded according to preparation method B and were applied to the inner surfaces of tires by hand using a paint brush. The amount of material applied was noted for each application and would correspond to a desired gauge thickness if a coating of uniform thickness were obtained.

The coated convenience spares were placed on a modified Temco Rotating Tire bead spreader, rotated at 5 rpm. The inside surface speed was measured at approximately 25 feet per minute. The coating was then cured by ultraviolet light radiation using a Fusion System Model I233/K523 horizontal irradiator unit having a single UV lamp and a reflector. The unit was designed to give substantially even radiation over the entire inner surface of the tire. Substantial uniformity of exposure was verified by placing self-adhesive backed UV Intensity Labels, supplied by UV Process Supply, Inc., Chicago, Ill. at various positions on the curved inner surface of the tire. These tapes also showed that radiation dosage levels in the three-dimensional curing (this example) are about the same as in two-dimensional curing (curing of flat composite samples). These photosensitive tapes exhibit a color change indicating the intensity of UV exposure.

The tire was cured as follows: The coated tire, on the modified Tempco Rotating Tire Bead Spreader was rotated at 5 rpm for about 32 seconds of precure, with the UV lamp on but the reflector not in place. Then the reflector was installed inside the tire and the tire cured for 128 seconds. Then the tire was air cooled for 5 minutes (blower on, UV lamp off). The tire was then further cured for 128 seconds. Then rotation of the tire was stopped and the tire was removed.

Test convenience spares were inflated to 55 psig at room temperature and monitored for 1 week to determine if there was any abnormal pressure loss. As steady pressure readings are obtained, the tires are placed in a walk-in oven at 130° F. Twenty-four hours later the tire pressures are adjusted to 60.0 psi before the start of data recording.

Periodic pressure readings were taken over a period of 42 days. Three replicate tires were used in this test. Results are shown in TABLE X-C below.

Two controls, (three replicate tires each), one a special test convenience spare as described above having an NR/SBR inner liner but with no photopolymer formulation applied thereto and the other a standard production convenience spare with an 80 mil bromobutyl liner, were tested by the same procedure. All tests were carried out at 130° F.

Results are shown in TABLE X-C below.

TABLE X
PHYSICAL PROPERTIES OF TIRE COMPOUNDS

| COMPOSITION | | | |
|---|---|---|---|
| Application | Innerliner | Innerliner | Carcass |
| Elastomer(s) | NR/SBR | Bromobutyl | NR |
| PHYSICAL PROPERTIES | | | |
| 100% Modulus, psi | 170 | 130 | 250 |
| Tensile, psi | 1740 | 1120 | 2780 |
| Elongation, % | 550 | 800 | 560 |
| Permeability | 2900 | 225 | — |

TABLE X-A

| | Formulation (Wt Parts) | |
|---|---|---|
| Sample | 1 | 2 |
| Photopolymer | 65.0 | 65.0 |
| NVP | 26.5 | 26.5 |
| PPGMM | 7.0 | 7.0 |
| IEM | 1.5 | 1.5 |
| Isopropanol | 1.0 | 3.0 |
| TPP | 1.0 | 1.0 |
| I651 | 1.5 | 1.5 |
| BP | 1.5 | 1.5 |

TABLE X-B

| Sample | 1 | 2 |
|---|---|---|
| Testing Conditions 75° F. | | |
| 100% Modulus, psi | 1270 | 900 |
| 200% Modulus, psi | 2660 | 1900 |
| Ult Elong, % | 265 | 275 |
| Ult Tensile, psi | 4130 | 3140 |
| Cresc Tear, ppi | 340 | 335 |
| Tension Set @ 100% | | |
| 1 min, % | 81 | 72 |
| 10 min, % | 48 | 38 |
| Permeability | | |
| 0% R H | 39 | 47 |
| 100% R H | 82 | 86 |

TABLE X-C

| | Air Pressure loss, psig | | | |
|---|---|---|---|---|
| Tire Days | 1 | 2 | 3 | 4 |
| 4 | 1.6 | 1.7 | 4.3 | 1.5 |
| 7 | 2.5 | 2.5 | 6.1 | 2.2 |
| 10 | 2.8 | 2.8 | 7.8 | 2.5 |
| 14 | 4.0 | 4.0 | 9.6 | 3.8 |
| 18 | 4.8 | 4.9 | 11.2 | 4.6 |
| 21 | 5.2 | 5.5 | 12.4 | 5.2 |
| 27 | 6.7 | 6.9 | 14.3 | 6.6 |
| 32 | 7.8 | 7.8 | 16.4 | 7.7 |
| 35 | 8.4 | 8.5 | 17.5 | 8.3 |
| 40 | 9.3 | 9.4 | 18.5 | 8.9 |
| 42 | 9.7 | 10.0 | 19.3 | 9.5 |

Notes:
Tire are as follows:
Tire #1 - Test tire coated with photopolymer formulation #1 of TABLE X-A
Tire #2 - Test tire coated with photopolymer formulaiton #2 of TABLE X-A
Tire #3 - Standard production tire (including 80 mil bromobutyl inner liner)
Tire #4 - Uncoated test tire (NR/SBR inner liner replaced the standard bromobutyl inner liner).

EXAMPLE 11

This example describes a preferred method for applying a photocurable composition of this invention to a green radial tire having a sulfur cure system and curing the photocurable composition and green tire.

Two green production tires containing standard bromobutyl inner liners were used in this example. Representative physical properties have been given in TABLE X.

The photocurable composition, or photopolymer formulation, used in this example had the composition shown in TABLE XI-A below.

TABLE XI-A

| Ingredient | phr |
|---|---|
| Photopolymer | 75.0 |
| NVP | 15.0 |
| PPGMM | 10.0 |
| Isopropanol | 5.5 |
| Photopolymer: Polyester MW 800 | |
| Chain extension ratio | 5.0 |

The radiation equipment used in this example was designed to give substantially uniform radiation intensity over the entire inner surface of a green tire. The equipment included a Fusion 3 KW microwave powered lamp.

The inside of each green tire was wiped with hexane and coated with a primer of 3 percent TCIA in ethyl acetate, while the tire was rotated at a speed of 27 feet/min. and a coating weight of 55 grams per tire (weight by difference; the application container was weighed before and afterward). (Air spraying can also be used). The primer may be applied by wiping or air spraying. The primer coating was exposed to a UV radiation dosage of at least 3 joules/cm$^2$. The tire was rotated 5 rpm for 8 minutes.

The tires were then coated by hand (average coating weight 145 grams), using a brush, with the liquid photopolymer formulation shown in TABLE XI-A. The photopolymer coating was then cured by exposure to at least 3 joules/cm$^2$ of UV radiation. The green tires were then thermally cured by conventional means.

Unsupported films were prepared from the photopolymer formulation of TABLE XI-A for test purposes. Tests were made at 75° C. Results are shown in TABLE XI-B.

TABLE XI-B

| Parameters | Value |
|---|---|
| 100% modulus, psi | 250 |
| 200% modulus, psi | 620 |
| Ultimate elongation, % | 300 |
| Ultimate tensile str., psi | 2240 |
| Crescent tear, psi | 65 |
| Tension set, 100% | |
| 1 min., % | 15 |
| 10 min., % | 10 |
| Permeability | |
| 0% RH | 67 |
| 100% RH | 96 |

EXAMPLE 12

This example describes a preferred method for applying a photocurable composition of this invention to a green radial tire and curing the photocurable composition and the tire.

Test tires were built according to standard production techniques except that a liner of natural rubber with a peroxide cure system replaced the usual bromobutyl air barrier inner liner. The sets of tires were built; the first set had a single layer (25 mils) of natural rubber liner, the second set had two layers (total 50 mils) of natural rubber liner, and the third set had three layers (total 75 mils) of natural rubber liner.

After tire construction and prior to curing, the tires were subjected to ultraviolet (UV) surface modification for adhesion, and then were coated with a photopolymer formulation, after which they were UV cured.

The inside of each green tire was coated with primer having the composition given in TABLE XII-A below.

TABLE XII-A

| Ingredient | Wt. per % |
| --- | --- |
| 2-ethylhexyl acrylate | 33.3 |
| Dicyclopentenyloxyethyl acrylate (DPOA) | 33.3 |
| C-2000 diacrylates of C-14 and C-15 diols | 33.3 |
| "Irgacure" 651 | 5 phr |

The above composition was applied by wiping while the tire was rotated at 27 feet per minute. Primer coating was allowed to dry 3 minutes at room temperature and was then exposed to a UV radiation dosage of at least 6.0 joules/cm$^2$, using a Fusion 3 KW microwave powered lamp. UV dosage was applied in successive cycles of 2 minutes each, with one minute of rest between cycles. Amounts of primer and total UV exposure time are shown in TABLE XII-B.

Tires were then coated with a liquid photopolymer formulation by hand using a brush. Compositions of the photopolymer formulations are given in TABLE XII-C. Coatings were cured by the above-described Fusion 3 KW UV light. UV dosage was applied in successive cycles of 2 minutes each, with one minute of rest between cycles. Coating weights and UV exposure times are given in TABLE XII-D. The green tires were then cured by conventional means.

In order to determine physical properties, each of the photopolymer formulations was cast onto an unsupported film and cured as described in "Preparation Methods" above. Physical properties are given in TABLE XII-E.

Tires of consistently high quality, with few if any blisters and with blisters confined to the bead area, were consistently obtained when 75 mils of inner liner was used. Only these results are reported in detail. Mixed results, ranging from a few blisters in the bead area to delamination in the bead area were obtained in tires having a 50 mil inner liner. Poorer results, with delamination in the bead area in all cases, were obtained in tires having a 25 mil inner liner.

Test tires prepared in acordance with this invention were tested according to U.S. Department of Transportation (DOT) Extended Endurance Test GO5. Test results are shown in TABLE XII-F. This table also shows under the heading "Cmpd", the photopolymer formulations (or compounds) used to prepare the respective test tires.

Four test and two control tires were inflated to 55 psig at room temperature and monitored for 1 week to determine if there was any abnormal pressure loss. As steady pressure readings are obtained, the tires are placed in a walk-in oven at 130° F. Twenty-four hours later the tire pressures are adjusted to 60.0 psi before the start of data recording. Three replicate tires each were tested for air retention in an accelerated test. The four test tires were prepared according to this example. The controls were, respectively, a radial tire having an NR/SBR inner liner but with no photopolymer formulation applied thereto, and a radial tire with an 80 mil bromobutyl liner. All tests were carried out at 130° F. Results are shown in TABLE XII-G below.

While in accordance with the patent statutes, a preferred embodiment and best mode has been presented, the scope of the invention is not limited thereto, but rather is measured by the scope of the attached claims.

TABLE XII-B

| | PRIMING | |
| --- | --- | --- |
| Tire No. | Amount of Primer gms | UV Exposure Time, min |
| 1 | 13.5 | 8 |
| 2 | 17.1 | 8 |
| 3 | 15.6 | 10 |
| 4 | 17.6 | 10 |
| 5 | 16.1 | 10 |
| 6 | 17.8 | 10 |
| 7 | 15.5 | 10 |
| 8 | 17.1 | 10 |
| 9 | 17.7 | 10 |
| 10 | 18.1 | 10 |
| 11 | 17.3 | 10 |

TABLE XII-C

| Photopolymer Formulations Used in Green Tires | | | | | | |
| --- | --- | --- | --- | --- | --- | --- |
| Sample | 1 | 2 | 3 | 4 | 5 | 6 |
| Photopolymer(1) | 65.0 | 75.0 | 75.0 | 75.0 | 75.0 | — |
| Photopolymer(2) | — | — | — | — | — | 75.0 |
| NVP | 28.0 | 15.0 | 15.0 | — | — | 25.0 |
| PPGMM | 7.0 | 10.0 | 10.0 | 5.0 | 5.0 | — |
| HEMA | — | — | — | 20.0 | — | — |
| HPMA | — | — | — | — | 20.0 | — |
| Isopropanol | — | 5.0 | — | — | — | — |

(1)Photopolymer based on 800 mol wt polyethylene adipate and TDI/HEMA (Chain Extension Ratio 5.0).
(2)Photopolymer based on 1200 mol wt polyethylene adipate and TDI/HEMA (Chain Extension Ratio 4.0).

TABLE XII-D

| | Photopolymer Application and Curing | | | |
| --- | --- | --- | --- | --- |
| Tire No | Photo Polymer Form # | Coating Weight gms | UV Exposure Time,min | Observations |
| 1 | 1 | 103 | 4 | No Blisters |
| 2 | 1 | 158 | 8 | One Blister |
| 3 | 2 | 144 | 4 | Few Blisters |
| 4 | 4 | 142 | 4 | No Blisters |
| 5 | 5 | 134 | 4 | No Blisters |
| 6 | 6 | 126 | 4 | No Blisters |
| 7 | 4 | 152 | 4 | One Blister |
| 8 | 5 | 139 | 4 | No Blisters |
| 9 | 2 | 142 | 4 | Few Blisters |
| 10 | 3 | 127 | 4 | One Blister |
| 11 | 6 | 130 | 4 | No Blister |

TABLE XII-E

| Sample | 1 | 2 | 3 | 4 | 5 | 6 |
| --- | --- | --- | --- | --- | --- | --- |
| Testing Conditions 75° F. | | | | | | |
| 100% Mod, psi | 770 | 270 | 250 | 660 | 600 | 280 |
| 200% Mod, psi | 1350 | 610 | 610 | 1140 | 1080 | 480 |
| Ult Elong,% | 315 | 320 | 300 | 320 | 330 | 370 |
| Ult Tens,ppi | 2960 | 2580 | 2240 | 2600 | 3180 | 2700 |
| Cresc Tear, ppi | 115 | 100 | 65 | 180 | 180 | 130 |
| Tension Set @ 100% | | | | | | |
| 1 Min, % | 33 | 16 | 15 | 28 | 23 | 38 |
| 10 Min, % | 17 | 9 | 10 | 17 | 14 | 21 |
| Scott Brittle | −10 | −26 | −30 | −42 | −51 | −34 |

TABLE XII-E-continued

| Sample | 1 | 2 | 3 | 4 | 5 | 6 |
|---|---|---|---|---|---|---|
| Pt deg C. | | | | | | |
| Permeability | | | | | | |
| 0% R H | 42 | 65 | 67 | 48 | 54 | 63 |
| 100% R H | 73 | 95 | 96 | 70 | 78 | 134 |

TABLE XII-F

DOT Extended Endurance Test-G05

| Tire ID | Mileage | Cmpd | Comments |
|---|---|---|---|
| 5 | 3400 | 5 | Many cracks (SH/SW) |
| 3 | 3400 | 2 | 1 cracks (2 inches) |
| 7 | 3400 | 4 | Many cracks (SH/SW) |
| 8 | 3400 | 5 | 2 cracks (3 inches) |
| 11 | 3400 | 6 | No cracks |

TABLE XII-G

Accelerated Air Retention Test

| | Air Pressure Lost, psi | | | | | |
|---|---|---|---|---|---|---|
| | Photopolymer Tire # | | | | Control Tires | |
| DAYS | None | 9 | 4 | 1 | 2 | Y-21 | Y-42 |
|---|---|---|---|---|---|---|---|
| 4 | 1.5 | 0.9 | 0.7 | 1.0 | 0.8 | 0.9 | 0.6 |
| 7 | 2.7 | 1.5 | 1.7 | 1.7 | 1.7 | 1.4 | 1.1 |
| 9 | 3.4 | 2.1 | 2.0 | 2.1 | 2.0 | 2.0 | 1.7 |
| 11 | 4.2 | 2.8 | 2.7 | 2.7 | 2.5 | 2.3 | 2.0 |
| 14 | 5.3 | 3.1 | 2.9 | 3.0 | 2.9 | 2.6 | 2.4 |
| 16 | 6.1 | 3.8 | 3.6 | 3.8 | 3.5 | 3.1 | 2.9 |
| 18 | 6.8 | 4.1 | 4.2 | 4.1 | 3.9 | 3.4 | 3.2 |
| 21 | 8.0 | 4.9 | 4.6 | 4.9 | 4.7 | 4.1 | 3.9 |
| 24 | 9.1 | 5.5 | 5.1 | 5.4 | 5.1 | 4.4 | 4.5 |
| 27 | 10.3 | 5.9 | 5.6 | 5.8 | 5.5 | 4.7 | 4.8 |
| 30 | 11.4 | 6.6 | 6.5 | 6.6 | 6.3 | 5.5 | 5.4 |

What is claimed is:

1. An end capped prepolymer having a molecular weight in the range of about 2,500 to about 10,000, said prepolymer being a reaction product of (1) a polyester diol having a molecular weight in the range of about 700 to about 1500, and a functionality not in excess of about 2.2 and formed by reaction of an alkanediol containing from 2 to about 6 carbon atoms or mixture thereof with an aliphatic dicarboxylic acid containing from 2 to about 10 carbon atoms or mixture thereof; (2) an organic diisocyanate or mixture thereof and (3) an addition polymerizable end group compound having one carbon-to-carbon double bond and one hydroxyl group per molecule, wherein the mole ration of —NCO groups in said diisocyanate to —OH groups in said diol is from about 1.12 to about 1.4, and wherein said end capped prepolymer is prepared by first reacting said polyester diol with said diisocyanate to form a diisocyanate terminated polyester urethane prepolymer comprising alternating units of said polyester diol and said diisocyanate and containing from about 2.5 to about 8 polyester diol units per mole, and then reacting said diisocyanate terminated prepolymer with said end group compound.

2. An end capped prepolymer according to claim 1 in which the molecular weight of said polyester diol is from about 750 to about 1200.

3. A composition according to claim 1 in which said alkanediol is ethylene glycol and said dicarboxylic acid is adipic acid.

4. A composition according to claim 1 containing from about 4 to about 6 polyester diol units per mole of end capped prepolymer.

5. An end capped prepolymer according to claim 1 in which the functionality of said urethane prepolymer is not in excess of 2.2.

6. An end capped prepolymer according to claim 1 in which the quantity of said end group compound is at least 95 percent of the quantity which is equivalent to the —NCO groups in said urethane prepolymer.

7. A composition according to claim 1 in which said end group compound is a lower hydroxyalkyl methacrylate.

8. A composition according to claim 7 in which said end group compound is 2-hydroxyethyl methacrylate.

9. A radiation curable composition comprising:
(a) from about 60 to about 90 parts by weight of an end capped prepolymer according to claim 1, and
(b) from about 40 to about 10 parts by weight of a monofunctional addition polymerizable reactive diluent monomer or mixture thereof, wherein said reactive diluent monomer or mixture thereof includes N-vinylpyrrolidone.

10. A radiation curable composition according to claim 9 in which said reactive diluent monomer or mixture thereof comprises said N-vinylpyrrolidone and at least one comonomer.

11. A radiation curable composition according to claim 9, said radiation curable composition being a photocurable composition which further comprises a photoinitiator or mixture thereof.

12. A composition according to claim 11 in which said photoinitiator is or mixture thereof includes 2,2-dimethoxy-2-phenoxyacetophenone.

13. A composition according to claim 11 in which said photoinitiator or mixture thereof further includes benzophenone.

14. A composition according to claim 9 further comprising a chain transfer agent or mixture thereof.

15. A composition according to claim 9 in which said chain transfer agent comprises a secondary aliphatic alcohol containing from 3 to about 10 carbon atoms or a mixture thereof.

16. A composition according to claim 15 in which said chain transfer agent comprises isopropyl alcohol.

17. A composition according to claim 9 further comprising a stabilizer or mixture thereof.

18. A composition according to claim 9 which is particularly suitable for application to a cured rubber substrate, said composition further comprising an adhesion promoting material.

19. A composition according to claim 18 in which said adhesion promoting material comprises isocyanatoethyl methacrylate.

20. An elastomer having an oxygen permeability not over 100 cc-mil/100 sq. in.-day at 0 percent relative humidity, an ultimate elongation of at least 200% and a 100% modulus not over 1200 psi, said elastomer being a reaction product formed by radiation curing of a composition according to claim 9.

21. An elastomer having an oxygen permeability not over 100 cc-mil/100 sq. in.-day at 0 percent relative humidity, an ultimate elongation of at least 200% and a 100% modulus not over 1200 psi, said cured elastomer being a reaction product formed by photocuring in the presence of actinic light a composition according to claim 9 which further comprises a photoinitiator or mixture thereof.

22. An elastomer according to claim 20, said elastomer being in the form of a sheet or film.

* * * * *